(12) United States Patent
Dudley et al.

(10) Patent No.: US 10,186,695 B2
(45) Date of Patent: Jan. 22, 2019

(54) BATTERY CELL ASSEMBLY

(71) Applicant: LG Chem, Ltd., Seoul (KR)

(72) Inventors: Scott Dudley, Commerce Township, MI (US); Curtis Wesley Chauvin, Detroit, MI (US); Robert Merriman, Shelby Township, MI (US)

(73) Assignee: LG Chem, Ltd., Seoul (KR)

( * ) Notice: Subject to any disclaimer, the term of this patent is extended or adjusted under 35 U.S.C. 154(b) by 523 days.

(21) Appl. No.: 14/936,792

(22) Filed: Nov. 10, 2015

(65) Prior Publication Data

US 2017/0133640 A1    May 11, 2017

(51) Int. Cl.
| | |
|---|---|
| *H01M 2/10* | (2006.01) |
| *H01M 2/02* | (2006.01) |
| *H01M 2/20* | (2006.01) |
| H01M 10/0525 | (2010.01) |
| H01M 2/04 | (2006.01) |

(52) U.S. Cl.
CPC ......... *H01M 2/1022* (2013.01); *H01M 2/021* (2013.01); *H01M 2/024* (2013.01); *H01M 2/0277* (2013.01); *H01M 2/1077* (2013.01); *H01M 2/202* (2013.01); H01M 2/0434 (2013.01); H01M 10/0525 (2013.01)

(58) Field of Classification Search
CPC ... H01M 2/1077; H01M 2/021; H01M 2/0242
See application file for complete search history.

(56) References Cited

U.S. PATENT DOCUMENTS

| 5,626,982 | A | 5/1997 | Kawai et al. |
| 7,976,980 | B2 * | 7/2011 | Yoon .................. H01M 2/1077 29/623.1 |
| 9,160,038 | B2 | 10/2015 | Buck et al. |
| 9,166,259 | B2 | 10/2015 | Ronning et al. |

(Continued)

FOREIGN PATENT DOCUMENTS

| CN | 202145470 U | 2/2012 |
| DE | 102008059971 A1 | 6/2010 |

(Continued)

OTHER PUBLICATIONS

Search Report for Application No. PCT/KR2016/012795 dated Feb. 15, 2017.

(Continued)

*Primary Examiner* — Ula C Ruddock
*Assistant Examiner* — Thomas H. Parsons
(74) *Attorney, Agent, or Firm* — Buckert Patent & Trademark Law Firm PC; John F. Buckert

(57) ABSTRACT

A battery cell assembly is provided. The battery cell assembly includes a polymeric foam container having first, second, third side walls defining an interior region. The first, second, and third side walls have first, second, and third grooves, respectively, extending therein. The battery cell assembly further includes a first battery cell having a first rectangular-shaped body with first, second, and third peripheral ledge portions. The first battery cell is disposed in the interior region such that first, second, and third peripheral ledge portions thereof are disposed in the first, second, and third grooves, respectively, in the first, second, and third side walls, respectively.

24 Claims, 19 Drawing Sheets

(56) References Cited

U.S. PATENT DOCUMENTS

| | | |
|---|---|---|
| 2013/0288100 A1 | 10/2013 | Dunkel et al. |
| 2015/0236313 A1 | 8/2015 | Stuetz et al. |

FOREIGN PATENT DOCUMENTS

| | | |
|---|---|---|
| DE | 102011016799 A1 | 3/2012 |
| DE | 102010047453 A1 | 4/2012 |
| JP | 5094175 B2 | 12/2012 |
| JP | 2015015217 A | 1/2015 |
| KR | 20130117779 A | 10/2013 |
| KR | 20140147412 A | 12/2014 |
| KR | 20150046168 A | 4/2015 |
| KR | 20150059179 A | 6/2015 |
| KR | 101538634 B1 | 7/2015 |

OTHER PUBLICATIONS

European Search Report for European Patent Application No. 16864538.0 dated Dec. 11, 2017.

\* cited by examiner

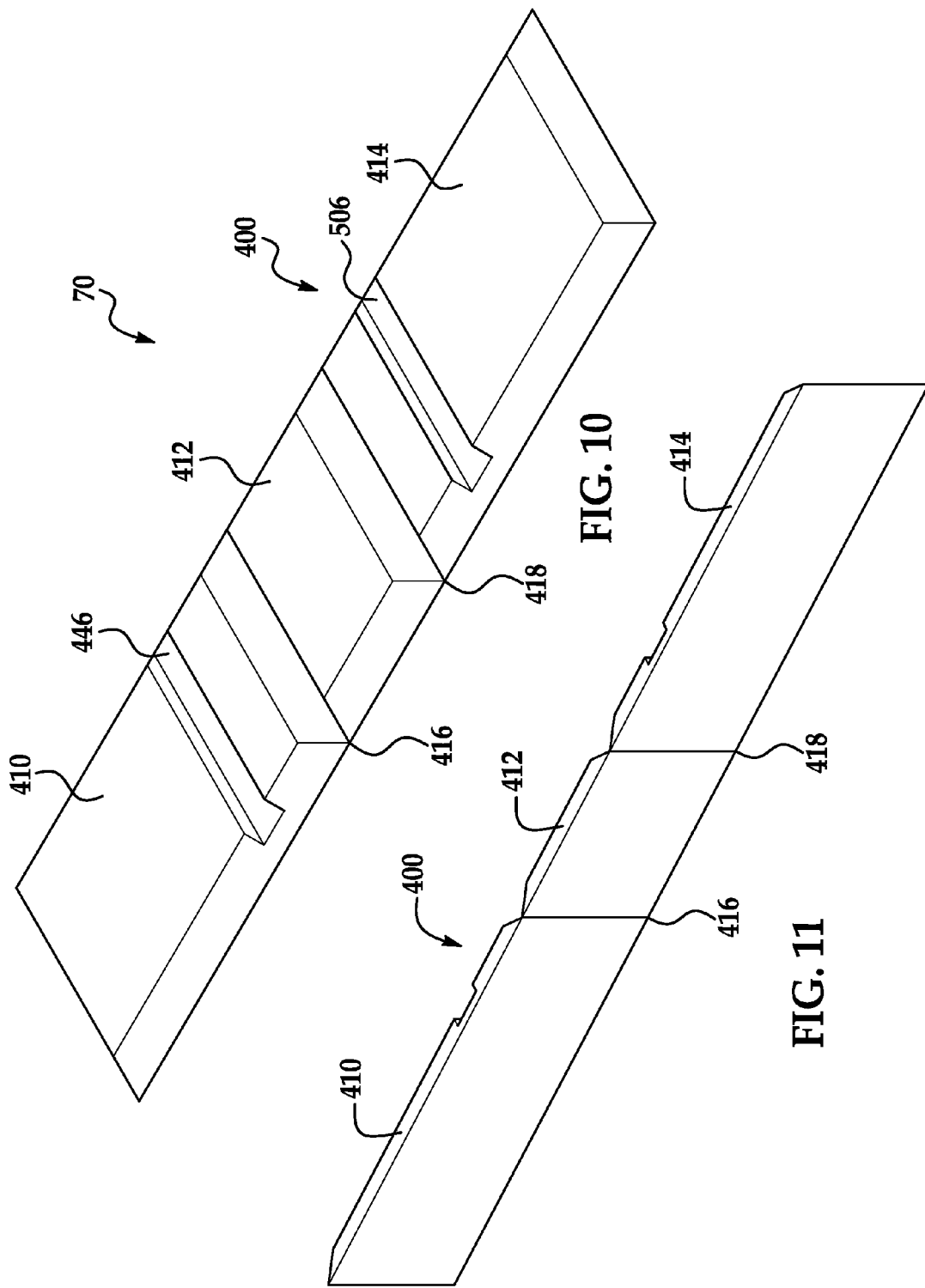

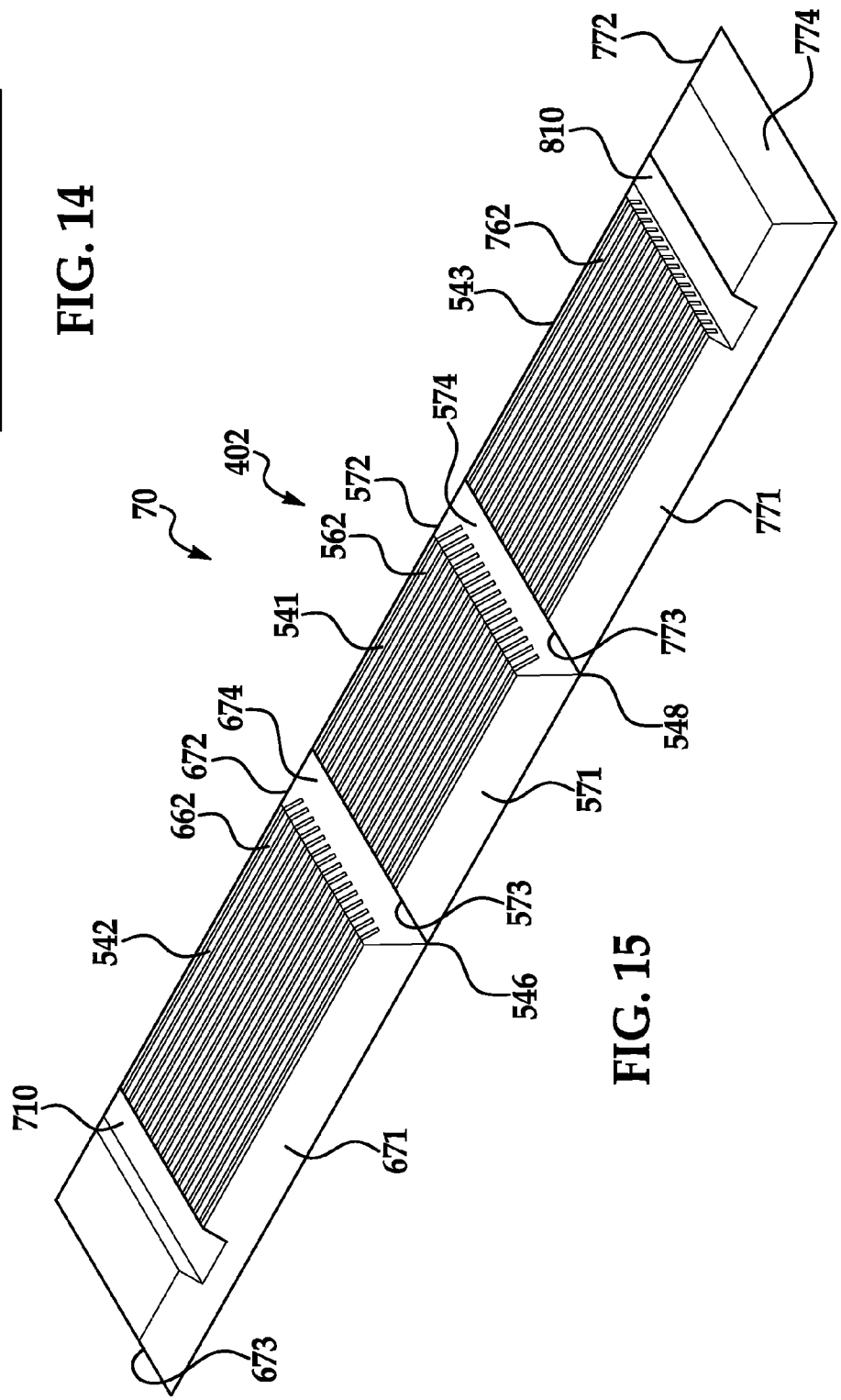

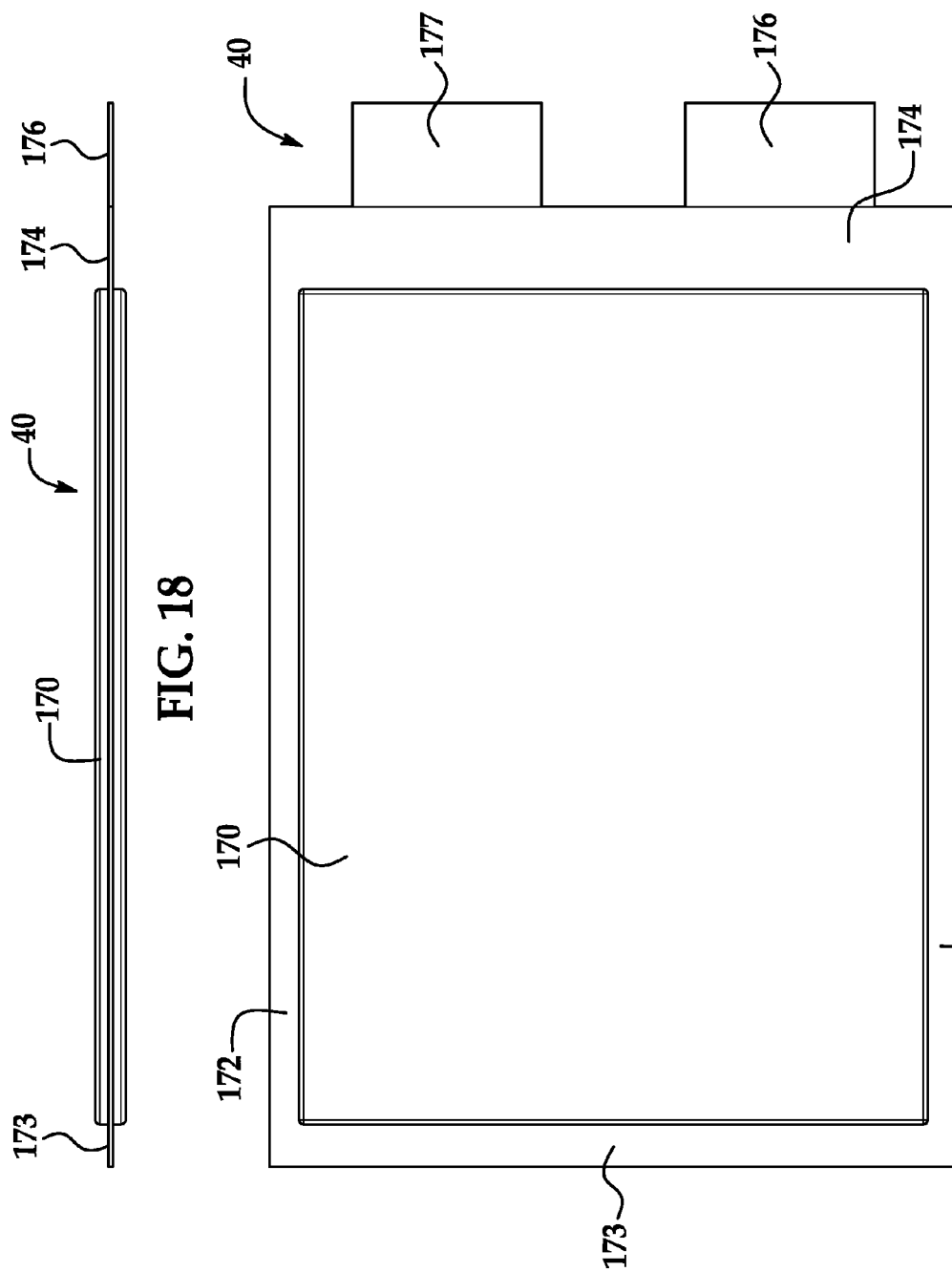

BATTERY CELL ASSEMBLY

BACKGROUND

The inventors herein have recognized a need for a battery cell assembly having an improved internal structure that both minimizes a transfer of thermal energy to battery cells within the structure and securely holds the battery cells therein.

SUMMARY

A battery cell assembly in accordance with an exemplary embodiment is provided. The battery cell assembly includes a polymeric foam container having first, second, and third side walls defining an interior region. The first and second side walls extend parallel to one another. The third side wall extends between the first and second side walls and perpendicular to the first and second, side walls. The first, second and third side walls have first, second, and third grooves, respectively, extending therein. The battery cell assembly further includes a first battery cell having a first rectangular-shaped body with first, second, and third peripheral ledge portions. The first and second peripheral ledge portions of the first battery cell extend parallel to one another. The third peripheral ledge portion of the first battery cell extends between the first and second peripheral ledge portions of the first battery cell and perpendicular to the first and second peripheral ledge portions of the first battery cell. The first battery cell is disposed in the interior region such that first, second, and third peripheral ledge portions thereof are disposed in the first, second, and third grooves, respectively, in the first, second, and third side walls, respectively.

BRIEF DESCRIPTION OF THE DRAWINGS

FIG. 10 is a schematic of a first unitary polymeric foam assembly utilized in the battery cell assembly of FIG. 1 in an uninstalled operational position;

FIG. 11 is another schematic of the first unitary polymeric foam assembly of FIG. 10;

FIG. 14 is a cross-sectional schematic of the first unitary polymeric foam assembly of FIG. 13 taken along lines 14-14 in FIG. 13;

FIG. 15 is a schematic of a second unitary polymeric foam assembly utilized in the battery cell assembly of FIG. 1 in an uninstalled operational position;

FIG. 18 is a side view of the battery cell of FIG. 17;

FIG. 19 is a top view of the battery cell of FIG. 17;

DETAILED DESCRIPTION

Figure 1:
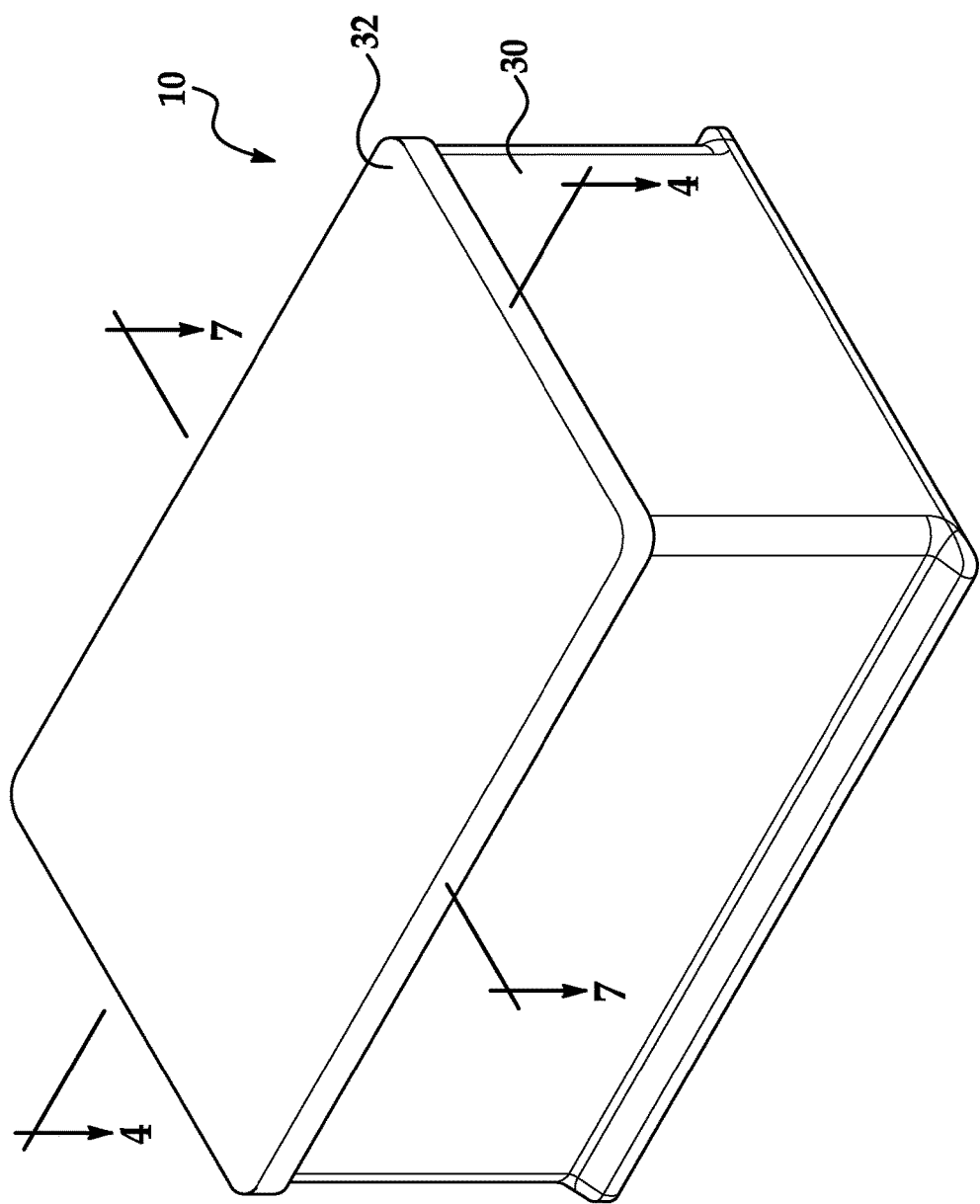
FIG. 1 is a schematic of a battery cell assembly in accordance with an exemplary embodiment.

Referring to FIGS. 1-9, a battery cell assembly 10 in accordance with an exemplary embodiment is provided. The battery cell assembly 10 includes a plastic housing 30, a housing cover 32, battery cells 40, 42, 44, 46, 48, 50, 52, 54, 56, 58, 60, 62, 64, 66, 68, a polymeric foam container 70, and an interconnect assembly 80. An advantage of the battery cell assembly 10 is that the assembly 10 utilizes the polymeric foam container 70 to insulate the battery cells 40-82 from external heat energy while also holding the battery cells 40-82 within grooves formed in the polymeric foam container 70. Thus, the battery cell assembly 10 does not need intermediate frame members or structural support members disposed between the battery cells for holding the battery cells in a fixed position.

Figure 2:
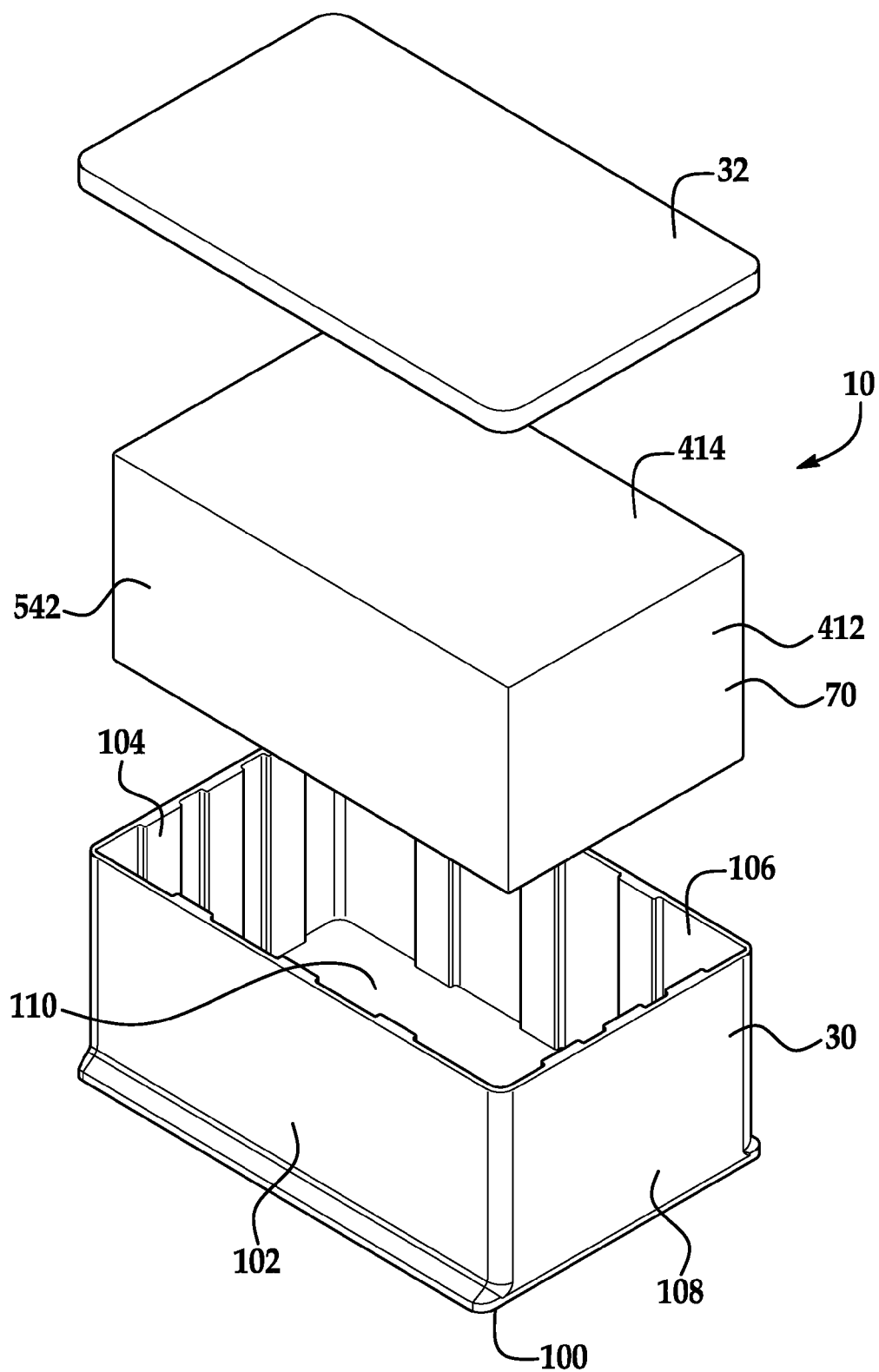
FIG. 2 is a partially exploded schematic of the battery cell assembly of FIG. 1.
Figure 9:
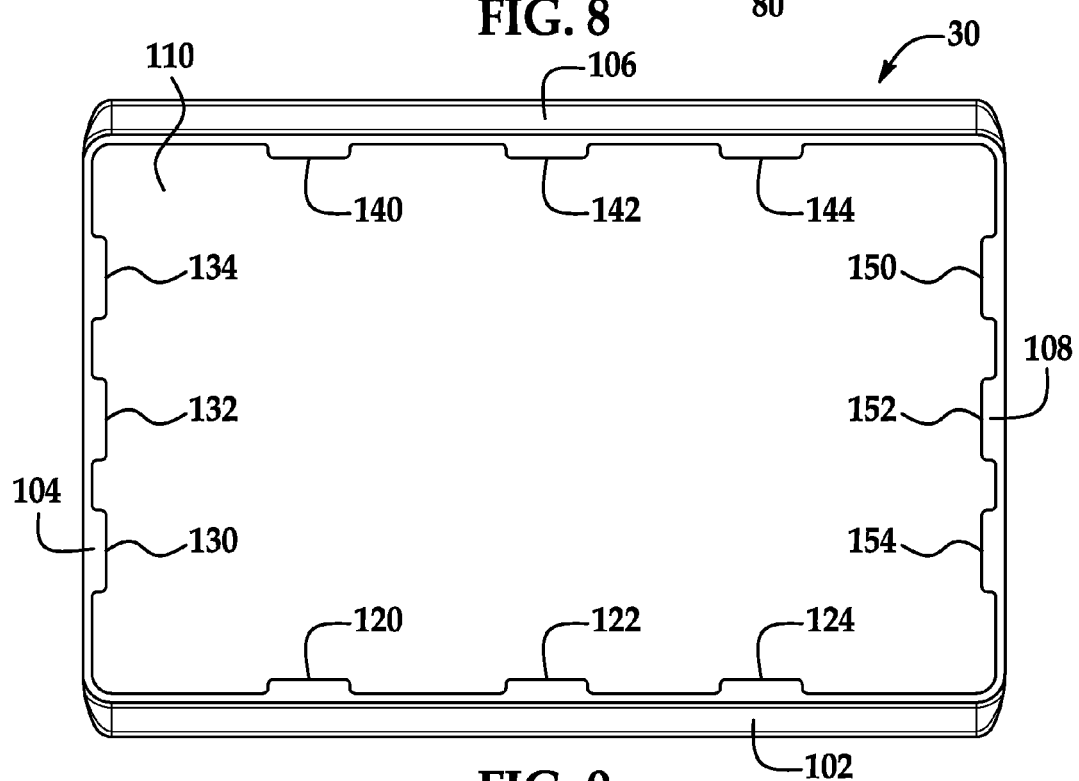
FIG. 9 is a top view of a plastic housing utilized in the battery cell assembly of FIG. 1.
Figure 12:
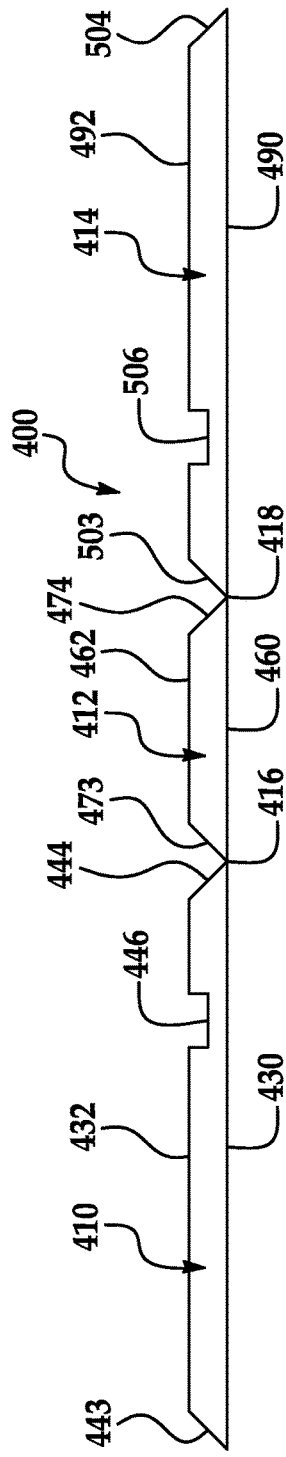
FIG. 12 is a side view of the first unitary polymeric foam assembly of FIG. 10.

Referring to FIGS. 1, 2 and 9, the plastic housing 30 is provided to hold the battery cells 40-82, the polymeric foam container 70, and interconnect assembly 80 therein. The plastic housing 30 includes a bottom wall 100 and side walls 102, 104, 106, 108 that define an inner space 110. The side walls 102, 106 are coupled to the bottom wall 100 and extend parallel to one another. The side walls 104, 108 are coupled to the bottom wall 100 and extend parallel to one another and perpendicular to the side walls 102, 106. The side wall 102 includes tabs 120, 122, 124 spaced apart from one another and extending inwardly into the inner space 110. The tabs 120, 122, 124 are configured to contact the polymeric foam container 70 when the container 70 is disposed within the inner space 110. Further, the side wall 104 includes tabs 130, 132, 134 spaced apart from one another and extending inwardly into the inner space 110. The tabs 130, 132, 134 are configured to contact the polymeric foam container 70 when the container 70 is disposed within the inner space 110. Also, the side wall 106 includes tabs 140, 142, 144 spaced apart from one another and extending inwardly into the inner space 110. The tabs 140, 142, 144 are configured to contact the polymeric foam container 70 when the container 70 is disposed within the inner space 110. Further, the side wall 108 includes tabs 150, 152, 154 spaced apart from one another and extending inwardly into the inner space 110. The tabs 150, 152, 154 are configured to contact the polymeric foam container 70 when the container 70 is disposed within the inner space 110.

Referring to FIGS. 7 and 17-19, the battery cells 40, 42, 44, 46, 48, 50, 52, 54, 56, 58, 60, 62, 64, 66, 68 are stacked on top of one another. In an exemplary embodiment, the battery cells 40-68 are each lithium-ion pouch-type battery cells. The structure of the battery cells 40-68 will be described in greater detail below.

The battery cell 40 has a rectangular-shaped body 170, peripheral ledge portions 171, 172, 173, 174, and electrical terminals 176, 177. The peripheral ledge portions 171, 172, 173, 174 are coupled to and extend outwardly from the rectangular-shaped body 170. The peripheral ledge portions 171, 172 extend parallel to one another, and the peripheral ledge portions 173, 174 extend parallel to one another and perpendicular to the peripheral ledge portions 171, 172. The peripheral ledge portion 173 extends between the peripheral ledge portions 171, 172 proximate to a first end of the rectangular-shaped body 170, and the peripheral ledge portion 174 extends between the peripheral ledge portions 171, 172 proximate to a second end of the rectangular-shaped body 170. The electrical terminals 176, 177 extend outwardly from the peripheral ledge portion 174.

Figure 5:
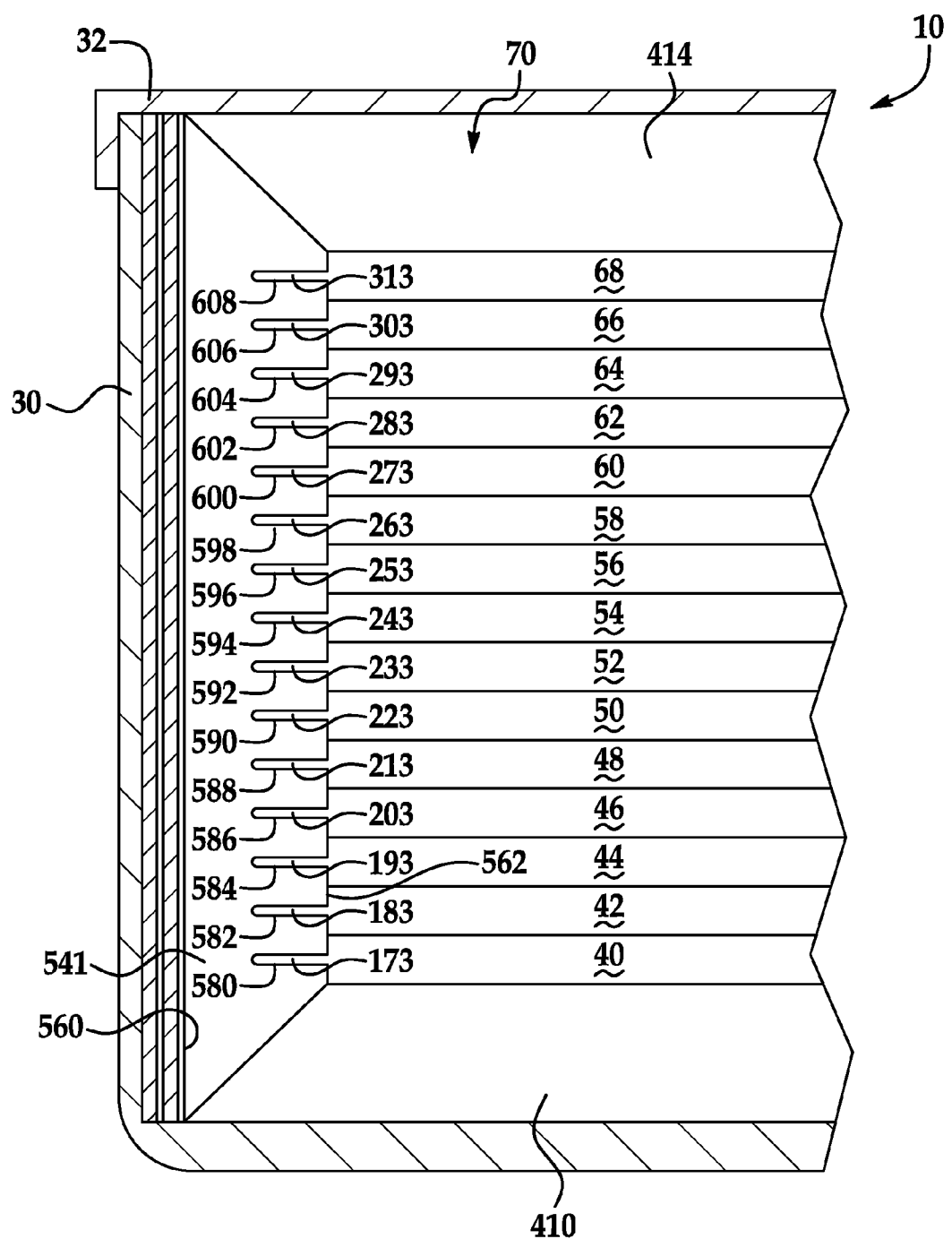
FIG. 5 is an enlarged schematic of a portion of the battery cell assembly of FIG. 4.
Figure 6:
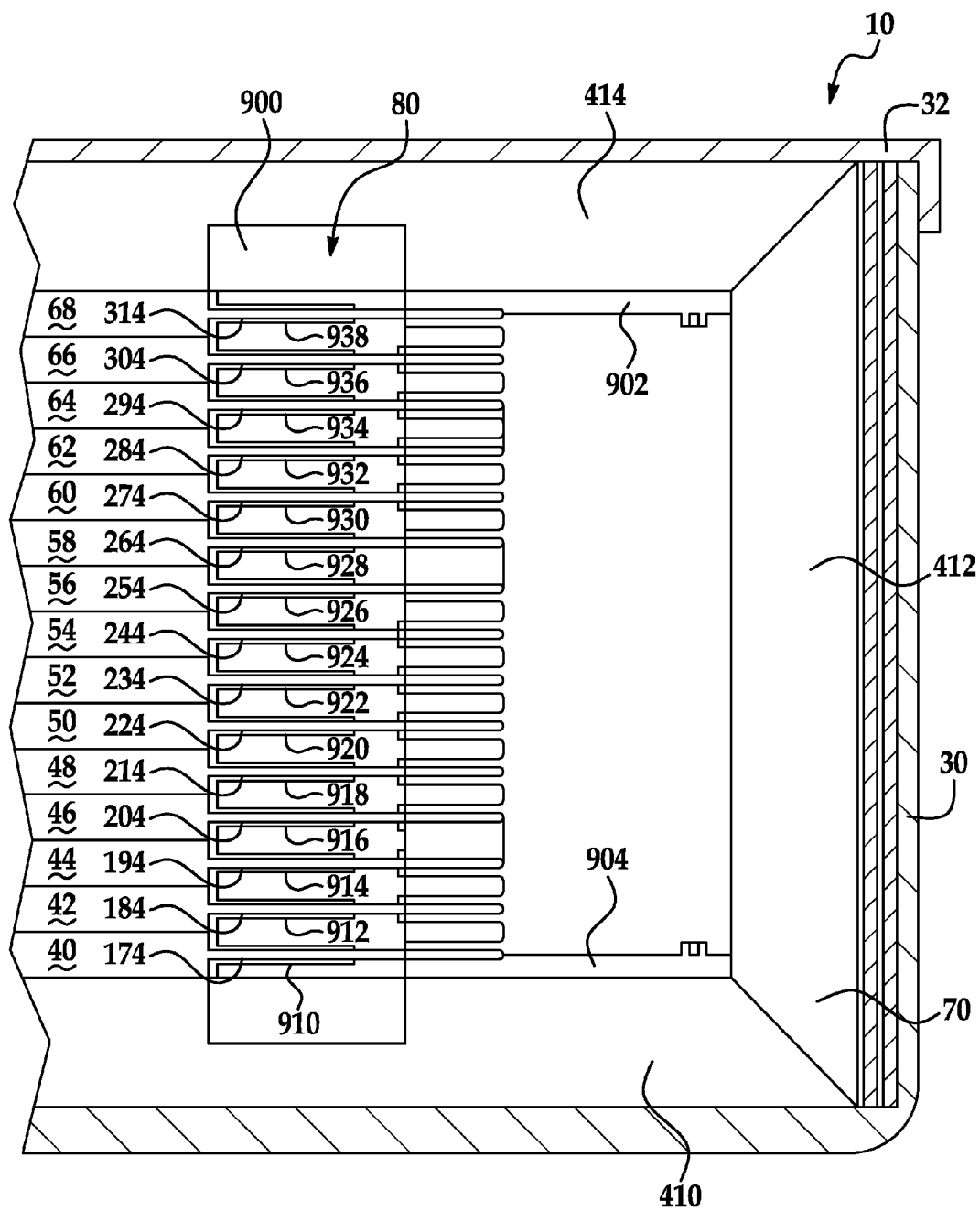
FIG. 6 is an enlarged schematic of another portion of the battery cell assembly of FIG. 4.
Figure 7:
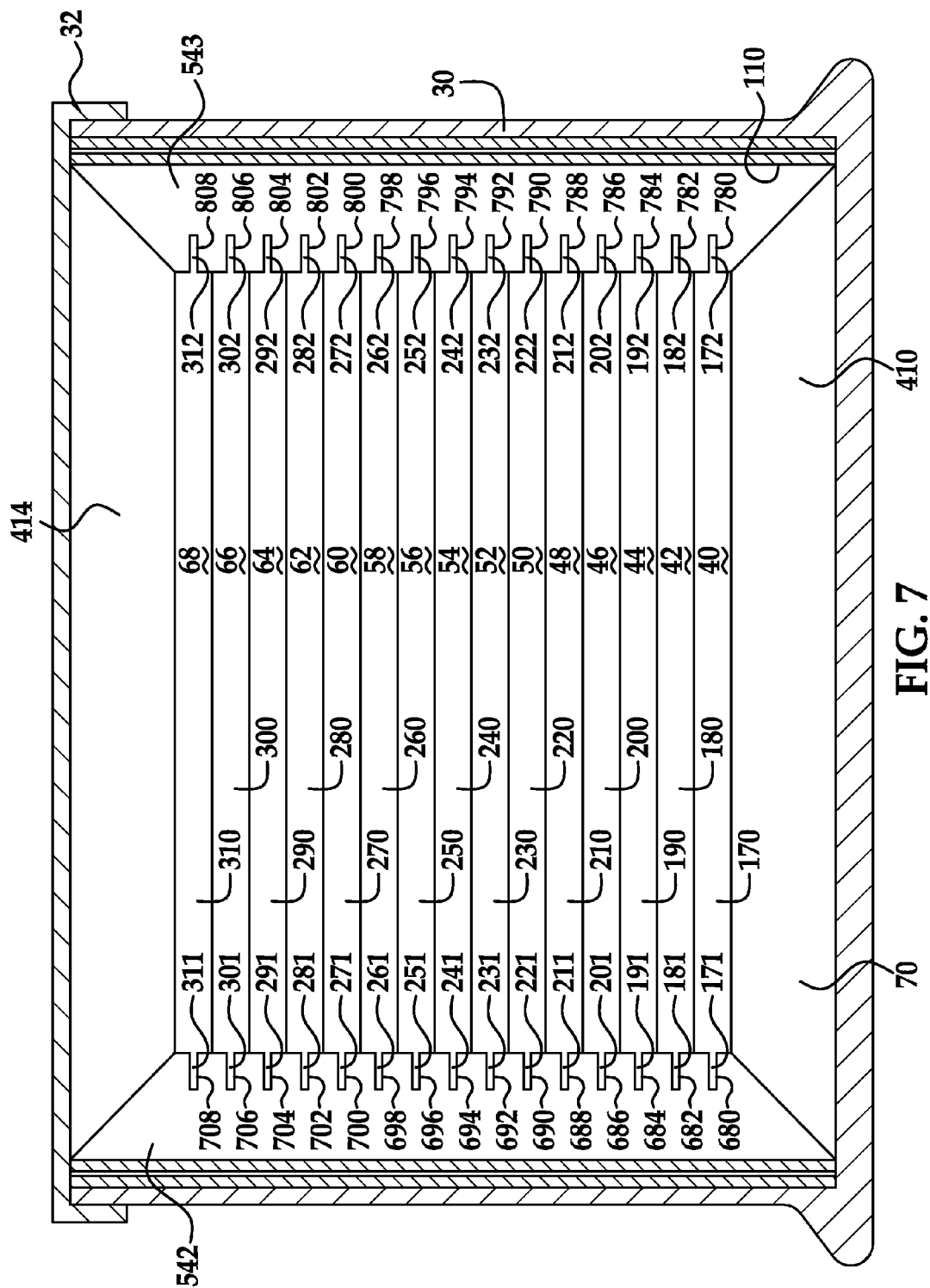
FIG. 7 is a cross-sectional schematic of the battery cell assembly of FIG. 1 taken along lines 7-7 in FIG. 1.

Referring to FIGS. 5-7, the battery cell 42 has a rectangular-shaped body 180, peripheral ledge portions 181, 182, 183, 184, and a pair of electrical terminals. The peripheral ledge portions 181, 182, 183, 184 are coupled to and extend outwardly from the rectangular-shaped body 180. The peripheral ledge portions 181, 182 extend parallel to one another, and the peripheral ledge portions 183, 184 extend parallel to one another and perpendicular to the peripheral ledge portions 181, 182. The peripheral ledge portion 183 extends between the peripheral ledge portions 181, 182 proximate to a first end of the rectangular-shaped body 180, and the peripheral ledge portion 184 extends between the peripheral ledge portions 181, 182 proximate to a second end of the rectangular-shaped body 180. The pair of electrical terminals extend outwardly from the peripheral ledge portion 184.

The battery cell 44 has a rectangular-shaped body 190, peripheral ledge portions 191, 192, 193, 194, and a pair of electrical terminals. The peripheral ledge portions 191, 192, 193, 194 are coupled to and extend outwardly from the rectangular-shaped body 190. The peripheral ledge portions 191, 192 extend parallel to one another, and the peripheral ledge portions 193, 194 extend parallel to one another and perpendicular to the peripheral ledge portions 191, 192. The peripheral ledge portion 193 extends between the peripheral ledge portions 191, 192 proximate to a first end of the rectangular-shaped body 190, and the peripheral ledge portion 194 extends between the peripheral ledge portions 191, 192 proximate to a second end of the rectangular-shaped body 190. The pair of electrical terminals extend outwardly from the peripheral ledge portion 194.

The battery cell 46 has a rectangular-shaped body 200, peripheral ledge portions 201, 202, 203, 204, and a pair of electrical terminals. The peripheral ledge portions 201, 202, 203, 204 are coupled to and extend outwardly from the rectangular-shaped body 200. The peripheral ledge portions 201, 202 extend parallel to one another, and the peripheral ledge portions 203, 204 extend parallel to one another and perpendicular to the peripheral ledge portions 201, 202. The peripheral ledge portion 203 extends between the peripheral ledge portions 201, 202 proximate to a first end of the rectangular-shaped body 200, and the peripheral ledge portion 204 extends between the peripheral ledge portions 201, 202 proximate to a second end of the rectangular-shaped body 200. The pair of electrical terminals extend outwardly from the peripheral ledge portion 204.

The battery cell 48 has a rectangular-shaped body 210, peripheral ledge portions 211, 212, 213, 214, and a pair of electrical terminals. The peripheral ledge portions 211, 212, 213, 214 are coupled to and extend outwardly from the rectangular-shaped body 210. The peripheral ledge portions 211, 212 extend parallel to one another, and the peripheral ledge portions 213, 214 extend parallel to one another and perpendicular to the peripheral ledge portions 211, 212. The peripheral ledge portion 213 extends between the peripheral ledge portions 211, 212 proximate to a first end of the rectangular-shaped body 210, and the peripheral ledge portion 214 extends between the peripheral ledge portions 211, 212 proximate to a second end of the rectangular-shaped body 210. The pair of electrical terminals extend outwardly from the peripheral ledge portion 214.

The battery cell 50 has a rectangular-shaped body 220, peripheral ledge portions 221, 222, 223, 224, and a pair of electrical terminals. The peripheral ledge portions 221, 222, 223, 224 are coupled to and extend outwardly from the rectangular-shaped body 220. The peripheral ledge portions 221, 222 extend parallel to one another, and the peripheral ledge portions 223, 224 extend parallel to one another and perpendicular to the peripheral ledge portions 221, 222. The peripheral ledge portion 223 extends between the peripheral ledge portions 221, 222 proximate to a first end of the rectangular-shaped body 220, and the peripheral ledge portion 224 extends between the peripheral ledge portions 221, 222 proximate to a second end of the rectangular-shaped body 220. The pair of electrical terminals extend outwardly from the peripheral ledge portion 224.

The battery cell 52 has a rectangular-shaped body 230, peripheral ledge portions 231, 232, 233, 234, and a pair of electrical terminals. The peripheral ledge portions 231, 232, 233, 234 are coupled to and extend outwardly from the rectangular-shaped body 230. The peripheral ledge portions 231, 232 extend parallel to one another, and the peripheral ledge portions 233, 234 extend parallel to one another and perpendicular to the peripheral ledge portions 231, 232. The peripheral ledge portion 233 extends between the peripheral ledge portions 231, 232 proximate to a first end of the rectangular-shaped body 230, and the peripheral ledge portion 234 extends between the peripheral ledge portions 231, 232 proximate to a second end of the rectangular-shaped body 230. The pair of electrical terminals extend outwardly from the peripheral ledge portion 234.

The battery cell 54 has a rectangular-shaped body 240, peripheral ledge portions 241, 242, 243, 244, and a pair of electrical terminals. The peripheral ledge portions 241, 242, 243, 244 are coupled to and extend outwardly from the rectangular-shaped body 240. The peripheral ledge portions 241, 242 extend parallel to one another, and the peripheral ledge portions 243, 244 extend parallel to one another and perpendicular to the peripheral ledge portions 241, 242. The peripheral ledge portion 243 extends between the peripheral ledge portions 241, 242 proximate to a first end of the rectangular-shaped body 240, and the peripheral ledge portion 244 extends between the peripheral ledge portions 241, 242 proximate to a second end of the rectangular-shaped body 240. The pair of electrical terminals extend outwardly from the peripheral ledge portion 244.

The battery cell 56 has a rectangular-shaped body 250, peripheral ledge portions 251, 252, 253, 254, and a pair of electrical terminals. The peripheral ledge portions 251, 252, 253, 254 are coupled to and extend outwardly from the rectangular-shaped body 250. The peripheral ledge portions 251, 252 extend parallel to one another, and the peripheral ledge portions 253, 254 extend parallel to one another and perpendicular to the peripheral ledge portions 251, 252. The peripheral ledge portion 253 extends between the peripheral ledge portions 251, 252 proximate to a first end of the rectangular-shaped body 250, and the peripheral ledge portion 254 extends between the peripheral ledge portions 251, 252 proximate to a second end of the rectangular-shaped body 250. The pair of electrical terminals extend outwardly from the peripheral ledge portion 254.

The battery cell 58 has a rectangular-shaped body 260, peripheral ledge portions 261, 262, 263, 264, and a pair of electrical terminals. The peripheral ledge portions 261, 262, 263, 264 are coupled to and extend outwardly from the rectangular-shaped body 260. The peripheral ledge portions 261, 262 extend parallel to one another, and the peripheral ledge portions 263, 264 extend parallel to one another and perpendicular to the peripheral ledge portions 261, 262. The peripheral ledge portion 263 extends between the peripheral ledge portions 261, 262 proximate to a first end of the rectangular-shaped body 260, and the peripheral ledge portion 264 extends between the peripheral ledge portions 261, 262 proximate to a second end of the rectangular-shaped body 260. The pair of electrical terminals extend outwardly from the peripheral ledge portion 264.

The battery cell 60 has a rectangular-shaped body 270, peripheral ledge portions 271, 272, 273, 274, and a pair of electrical terminals. The peripheral ledge portions 271, 272, 273, 274 are coupled to and extend outwardly from the rectangular-shaped body 270. The peripheral ledge portions 271, 272 extend parallel to one another, and the peripheral ledge portions 273, 274 extend parallel to one another and perpendicular to the peripheral ledge portions 271, 272. The peripheral ledge portion 273 extends between the peripheral ledge portions 271, 272 proximate to a first end of the rectangular-shaped body 270, and the peripheral ledge portion 274 extends between the peripheral ledge portions 271, 272 proximate to a second end of the rectangular-shaped body 270. The pair of electrical terminals extend outwardly from the peripheral ledge portion 274.

The battery cell 62 has a rectangular-shaped body 280, peripheral ledge portions 281, 282, 283, 284, and a pair of electrical terminals. The peripheral ledge portions 281, 282, 283, 284 are coupled to and extend outwardly from the rectangular-shaped body 280. The peripheral ledge portions 281, 282 extend parallel to one another, and the peripheral ledge portions 283, 284 extend parallel to one another and perpendicular to the peripheral ledge portions 281, 282. The peripheral ledge portion 283 extends between the peripheral ledge portions 281, 282 proximate to a first end of the rectangular-shaped body 280, and the peripheral ledge portion 284 extends between the peripheral ledge portions 281, 282 proximate to a second end of the rectangular-shaped body 280. The pair of electrical terminals extend outwardly from the peripheral ledge portion 284.

The battery cell 64 has a rectangular-shaped body 290, peripheral ledge portions 291, 292, 293, 294, and a pair of electrical terminals. The peripheral ledge portions 291, 292, 293, 294 are coupled to and extend outwardly from the rectangular-shaped body 290. The peripheral ledge portions 291, 292 extend parallel to one another, and the peripheral ledge portions 293, 294 extend parallel to one another and perpendicular to the peripheral ledge portions 291, 292. The peripheral ledge portion 293 extends between the peripheral ledge portions 291, 292 proximate to a first end of the rectangular-shaped body 290, and the peripheral ledge portion 294 extends between the peripheral ledge portions 291, 292 proximate to a second end of the rectangular-shaped body 290. The pair of electrical terminals extend outwardly from the peripheral ledge portion 294.

The battery cell 66 has a rectangular-shaped body 300, peripheral ledge portions 301, 302, 303, 304, and a pair of electrical terminals. The peripheral ledge portions 301, 302, 303, 304 are coupled to and extend outwardly from the rectangular-shaped body 300. The peripheral ledge portions 301, 302 extend parallel to one another, and the peripheral ledge portions 303, 304 extend parallel to one another and perpendicular to the peripheral ledge portions 301, 302. The peripheral ledge portion 303 extends between the peripheral ledge portions 301, 302 proximate to a first end of the rectangular-shaped body 300, and the peripheral ledge portion 304 extends between the peripheral ledge portions 301, 302 proximate to a second end of the rectangular-shaped body 300. The pair of electrical terminals extend outwardly from the peripheral ledge portion 304.

The battery cell 68 has a rectangular-shaped body 310, peripheral ledge portions 311, 312, 313, 314, and a pair of electrical terminals. The peripheral ledge portions 311, 312, 313, 314 are coupled to and extend outwardly from the rectangular-shaped body 310. The peripheral ledge portions 311, 312 extend parallel to one another, and the peripheral ledge portions 313, 314 extend parallel to one another and perpendicular to the peripheral ledge portions 311, 312. The peripheral ledge portion 313 extends between the peripheral ledge portions 311, 312 proximate to a first end of the rectangular-shaped body 310, and the peripheral ledge portion 314 extends between the peripheral ledge portions 311, 312 proximate to a second end of the rectangular-shaped body 310. The pair of electrical terminals extend outwardly from the peripheral ledge portion 314.

Referring to FIGS. 4 and 10-16, the polymeric foam container 70 is provided to minimize or eliminate a transfer of thermal energy from outside the battery cell assembly 10 into the battery cells 40-68. The polymeric foam container 70 includes a first unitary polymeric foam assembly 400 (shown in FIG. 10) and a second unitary polymeric foam assembly 402 (shown in FIG. 15). The first and second unitary polymeric foam assemblies 400, 402 are coupled together to hold the battery cells 40-68 therein. The first and second unitary polymeric foam assemblies 400, 402 define a bottom wall 410, a side wall 412, a top wall 414, and side walls 541, 542, 543 of the polymeric foam container 70 as will be described in greater detail below. In an exemplary embodiment, the polymeric foam container 70 is constructed of a polyethylene foam. In an alternative embodiment, the polymeric foam container 70 is constructed of a polyurethane foam. Of course, in other alternative embodiments, the polymeric foam container 70 could be constructed of other polymers having desired thermal characteristics.

Figure 4:
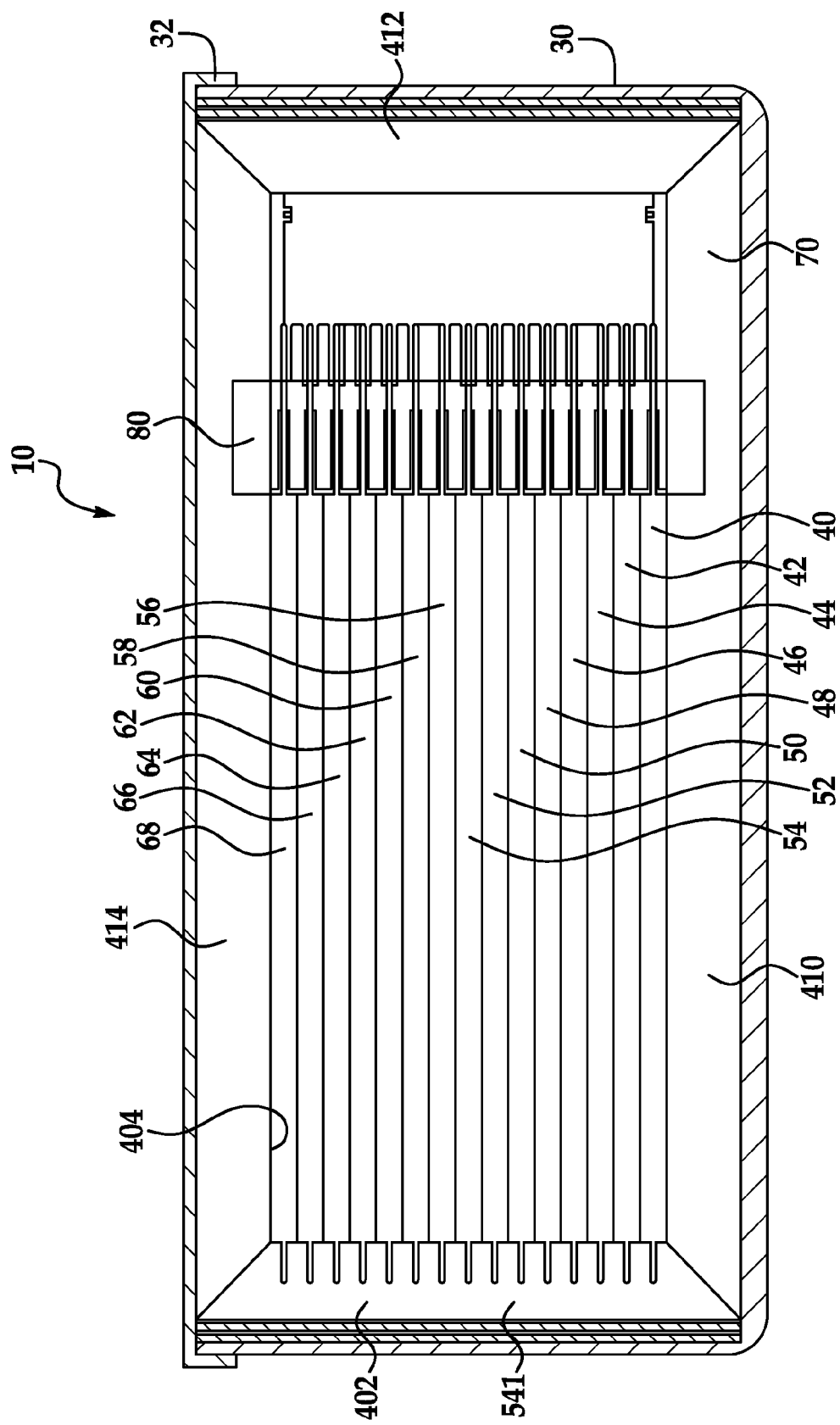
FIG. 4 is a cross-sectional schematic of the battery cell assembly of FIG. 1 taken along lines 4-4 in FIG. 1.
Figure 24:
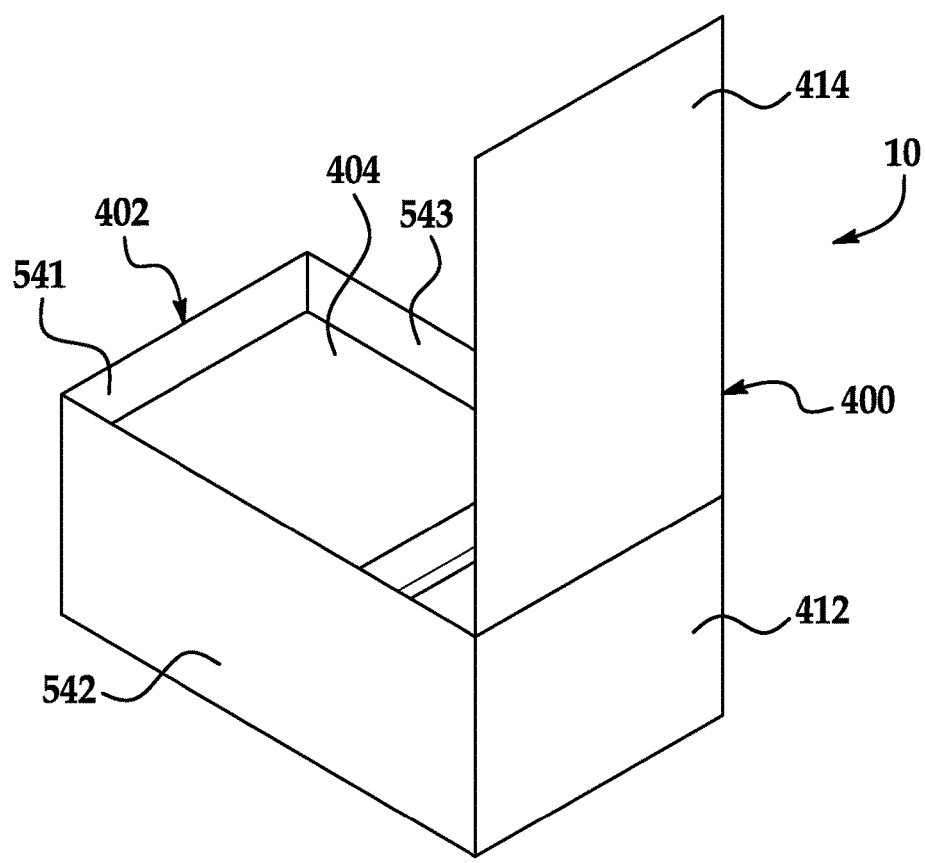
FIG. 24 is a schematic of a plurality of battery cells and an interconnect assembly disposed on the first unitary polymeric foam assembly of FIG. 10, and the second unitary polymeric foam assembly of FIG. 15 attached to first, second, and third sides of the plurality of battery cells, and the first unitary polymeric foam assembly attached to a fourth side of the plurality of battery cells.

Referring to FIG. 24, when the first and second unitary polymeric foam assemblies 400, 402 are coupled together the assemblies 400, 402 define an interior region 404 (shown in FIG. 4). Further, the side walls of 542, 543 extend parallel to one another. Further, the side wall 541 extends between the side walls 542, 543 perpendicular to the side walls 542, 543. Also, the side wall 412 extends between the side walls 542, 543 perpendicular to the side walls 542, 543 and parallel to the side wall 541.

Referring to FIGS. 10-14 and 24, the first unitary polymeric foam assembly 400 includes the bottom wall 410, the side wall 412, the top wall 414, and living hinges 416, 418. The bottom wall 410, the side wall 412, and the top wall 414 have a rectangular-shaped outer periphery in an uninstalled operational position. The bottom wall 410 is rotatably coupled to the side wall 412 utilizing the living hinge 416. The side wall 412 is rotatably coupled to the top wall 414 utilizing the living hinge 418. The living hinge 416 extends parallel to the living hinge 418. In an alternative embodiment, the bottom wall 410, the side wall 412, and the top wall 414 could be distinct and separate components that are not coupled together utilizing living hinges.

The bottom wall 410 is adapted to hold the stack of battery cells 40-68 and thereon. The bottom wall 410 has an outer rectangular-shaped surface 430, an inner rectangular-shaped surface 432, and trapezoidal-shaped side surfaces 441, 442, 443, 444. The outer rectangular-shaped surface 430 is disposed substantially parallel to the inner rectangular-shaped surface 432. The outer rectangular-shaped surface 430 is larger than the inner rectangular-shaped surface 432. The trapezoidal-shaped side surfaces 441, 442, 443, 444 are coupled to and extend between the outer rectangular-shaped surface 430 and the inner rectangular-shaped surface 432. The bottom wall 410 further includes a groove 446 extending into the inner rectangular-shaped surface 432 thereof. The groove 446 extends from the trapezoidal-shaped side surface 441 to the trapezoidal-shaped side surface 442 of the bottom wall 410. The groove 446 is sized and shaped to receive a portion of the interconnect assembly 80 (shown in FIG. 20) therein.

The side wall 412 has an outer rectangular-shaped surface 460, an inner rectangular-shaped surface 462, and trapezoidal-shaped side surfaces 471, 472, 473, 474. The outer rectangular-shaped surface 460 is disposed substantially parallel to the inner rectangular-shaped surface 462. The outer rectangular-shaped surface 460 is larger than the inner rectangular-shaped surface 462. The trapezoidal-shaped side surfaces 471, 472, 473, 474 are coupled to and extend between the outer rectangular-shaped surface 460 and the inner rectangular-shaped surface 462. The living hinge 416 is disposed proximate to the trapezoidal-shaped side surface 444 of the bottom wall 410 and the trapezoidal-shaped side surface 473 of the side wall 412.

The top wall 414 is adapted to cover a top region of the stack of battery cells 40-68. The top wall 414 has an outer rectangular-shaped surface 490, an inner rectangular-shaped surface 492, and trapezoidal-shaped side surfaces 501, 502, 503, 504. The outer rectangular-shaped surface 490 is disposed substantially parallel to the inner rectangular-shaped surface 492. The outer rectangular-shaped surface 490 is larger than the inner rectangular-shaped surface 492. The trapezoidal-shaped side surfaces 501, 502, 503, 504 are coupled to and extend between the outer rectangular-shaped surface 490 and the inner rectangular-shaped surface 492. The living hinge 418 is disposed proximate to the trapezoidal-shaped side surface 474 of the side wall 412 and the trapezoidal-shaped side surface 503 of the top wall 414. The top wall 414 further includes a groove 506 extending into the inner rectangular-shaped surface 492 thereof. The groove 506 extends from the trapezoidal-shaped side surface 501 to the trapezoidal-shaped side surface 502. The groove 506 is sized and shaped to receive a portion of the interconnect assembly 80 (shown in FIG. 20) therein.

Referring to FIGS. 4, 5, 7, 15 and 16, the second unitary polymeric foam assembly 402 includes the side walls 541, 542, 543 and living hinges 546, 548. The side walls 541, 542, 543 have a rectangular-shaped outer periphery in an uninstalled operational position. The side wall 541 is disposed between and coupled to the side walls 542, 543. The side wall 542 is rotatably coupled to the side wall 541 with the living hinge 546. The side wall 543 is rotatably coupled to the side wall 541 with the living hinge 548. The living hinge 546 extends parallel to the living hinge 548. In an alternative embodiment, the side walls 541, 542, 543 could be distinct and separate components that are not coupled together utilizing living hinges.

The side wall 541 has an outer rectangular-shaped surface 560, an inner rectangular-shaped surface 562, and trapezoidal-shaped side surfaces 571, 572, 573, 574. The outer rectangular-shaped surface 560 is disposed substantially parallel to the inner rectangular-shaped surface 562. The outer rectangular-shaped surface 560 is larger than the inner rectangular-shaped surface 562. The trapezoidal-shaped side surfaces 571, 572, 573, 574 are coupled to and extend between the outer rectangular-shaped surface 560 and the inner rectangular-shaped surface 562. The living hinge 546 is disposed proximate to the trapezoidal-shaped side surface 674 of the side wall 542 and the trapezoidal-shaped side surface 573 of the side wall 541.

Figure 13:
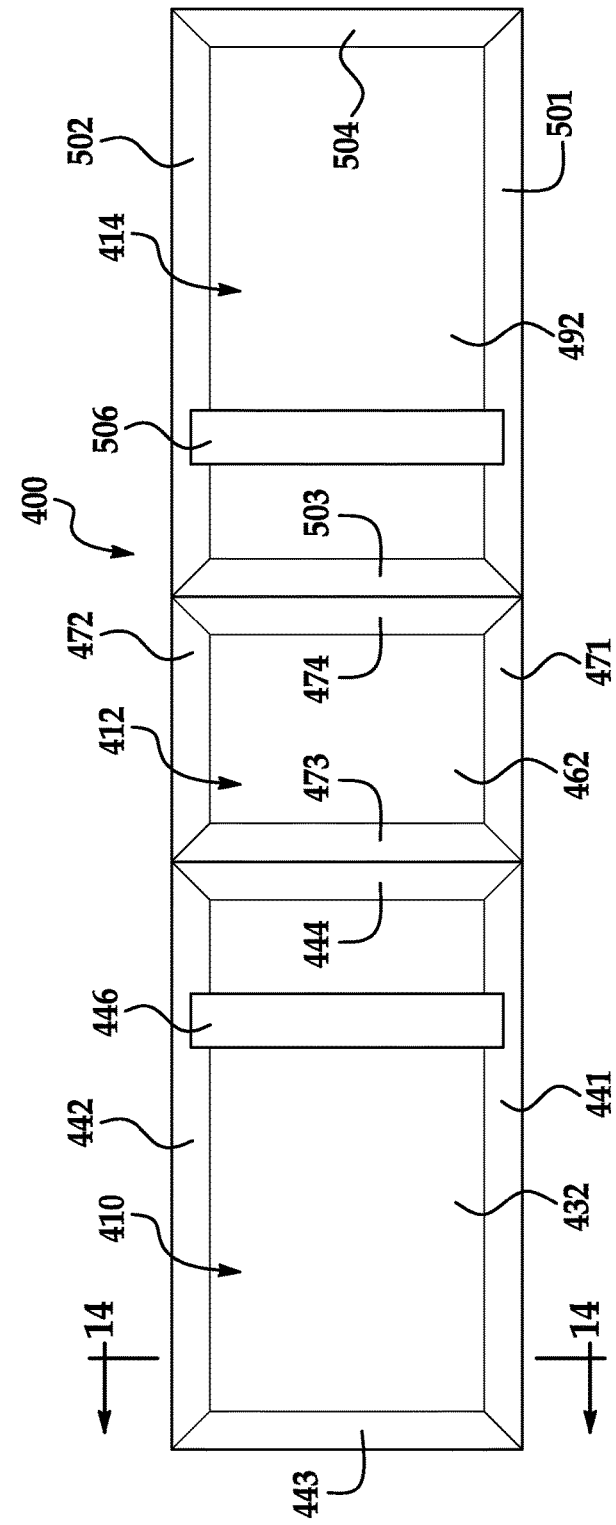
FIG. 13 is a top view of the first unitary polymeric foam assembly of FIG. 10.

Referring to FIGS. 5 and 13, the side wall 541 includes grooves 580, 582, 584, 586, 588, 590, 592, 594, 596, 598, 600, 602, 604, 606, 608 extending into the inner rectangular-shaped surface 562 of the side wall 541. The grooves 580-608 extend from the trapezoidal-shaped side surface 573 to the trapezoidal-shaped side surface 574 of the side wall 541. Further, each of the grooves 580-608 extend substantially parallel to one another, and each of the grooves 580-608 are spaced apart a predetermined distance from adjacent grooves. The grooves 580, 582, 584, 586, 588, 590, 592, 594, 596, 598, 600, 602, 604, 606, 608 are sized and shaped to receive the peripheral ledge portions 173, 183, 193, 203, 213, 223, 233, 243, 253, 263, 273, 283, 293, 303, 313, respectively, of the battery cells 40, 42, 44, 46, 48, 50, 52, 54, 56, 58, 60, 62, 64, 66, 68, respectively, therein.

Figure 16:
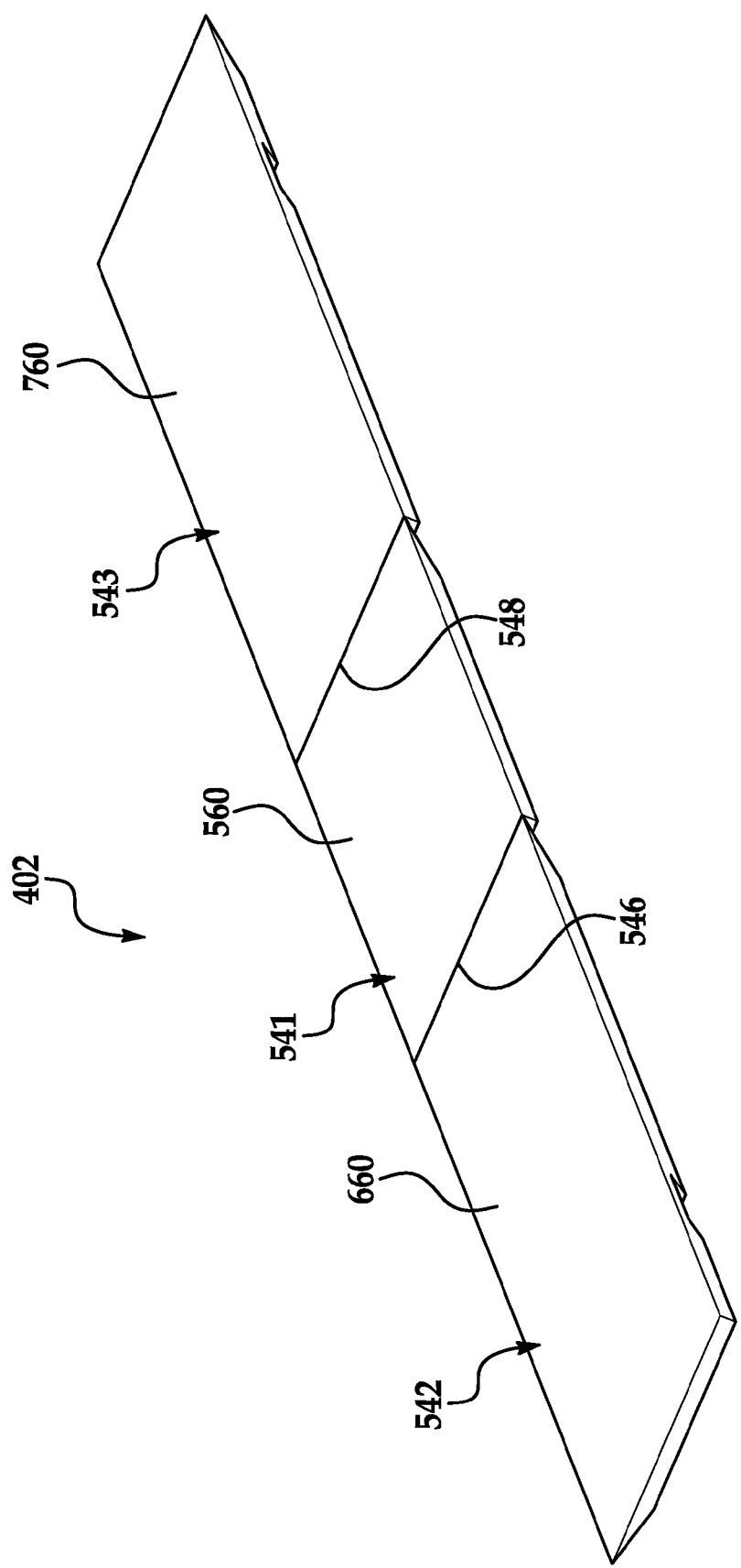
FIG. 16 is another schematic of the second unitary polymeric foam assembly of FIG. 15.
Figure 17:
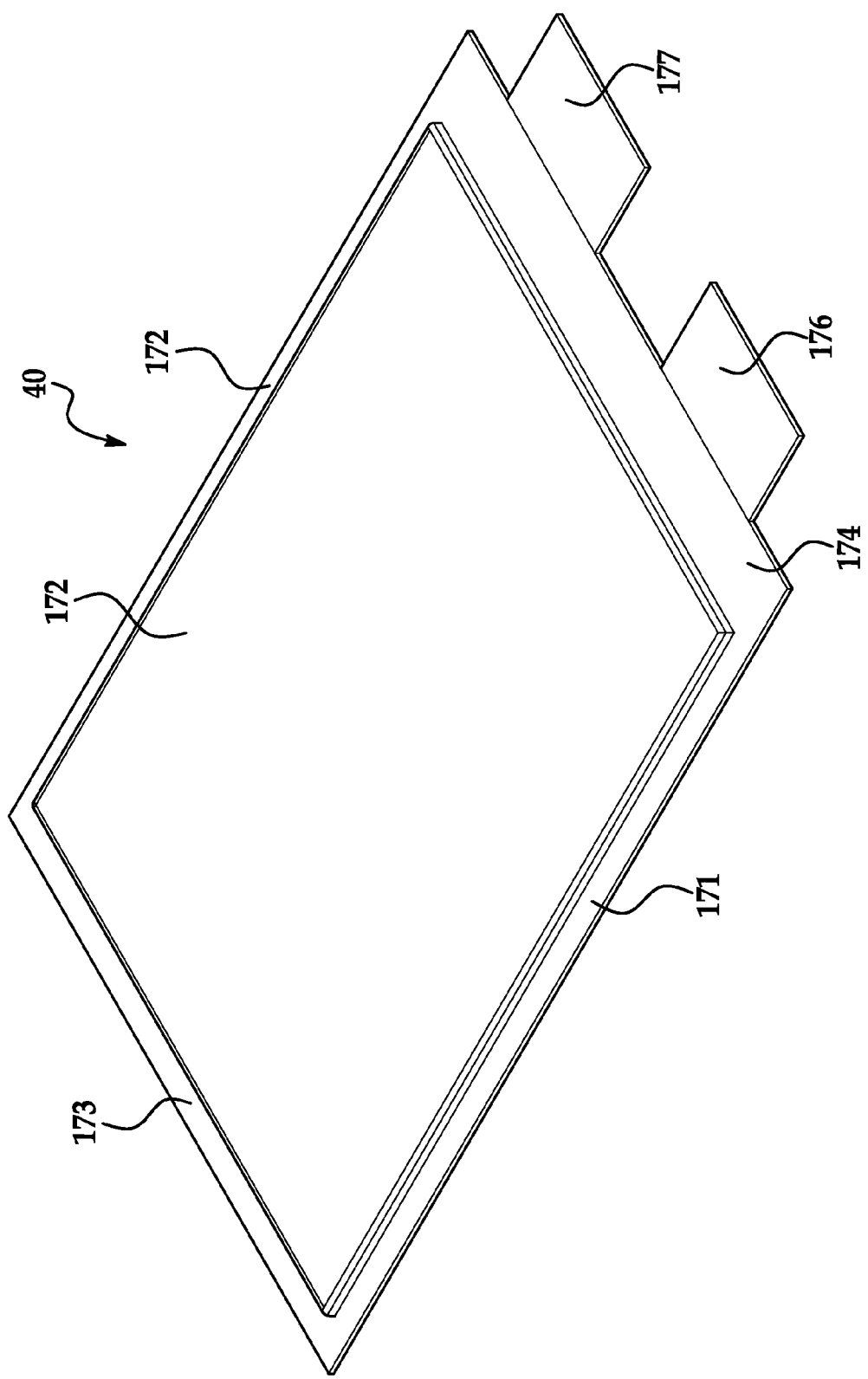
FIG. 17 is a schematic of a battery cell utilized in the battery cell assembly of FIG. 1.

Referring to FIGS. 7, 15 and 16, the side wall 542 has an outer rectangular-shaped surface 660, an inner rectangular-shaped surface 662, and trapezoidal-shaped side surfaces 671, 672, 673, 674. The outer rectangular-shaped surface 660 is disposed substantially parallel to the inner rectangular-shaped surface 662. The outer rectangular-shaped surface 660 is larger than the inner rectangular-shaped surface 662. The trapezoidal-shaped side surfaces 671, 672, 673, 674 are coupled to and extend between the outer rectangular-shaped surface 660 and the inner rectangular-shaped surface 662.

Referring to FIGS. 7 and 15, the side wall 542 includes grooves 680, 682, 684, 686, 688, 690, 692, 694, 696, 698, 700, 702, 704, 706, 708 extending into the inner rectangular-shaped surface 662 of the side wall 542. The grooves 680-708 extend from the trapezoidal-shaped side surface 674 toward the trapezoidal-shaped side surface 673. Further, each of the grooves 680-708 extend substantially parallel to one another, and each of the grooves 680-708 are spaced apart a predetermined distance from adjacent grooves. The grooves 680, 682, 684, 686, 688, 690, 692, 694, 696, 698, 700, 702, 704, 706, 708 are sized and shaped to receive the peripheral ledge portions 171, 181, 191, 201, 211, 221, 231, 241, 251, 261, 271, 281, 291, 301, 311, respectively, of the battery cells 40, 42, 44, 46, 48, 50, 52, 54, 56, 58, 60, 62, 64, 66, 68, respectively, therein.

Referring to FIG. 15, the side wall 542 further includes a groove 710 extending into the inner rectangular-shaped surface 662 thereof. The groove 710 extends from the trapezoidal-shaped side surface 671 to the trapezoidal-shaped side surface 672 and substantially perpendicular to the grooves 680-708. The groove 710 is sized and shaped to receive a portion of the interconnect assembly 80 (shown in FIG. 20) therein.

Referring to FIGS. 7, 15 and 16, the side wall 543 has an outer rectangular-shaped surface 760, an inner rectangular-shaped surface 762, and trapezoidal-shaped side surfaces 771, 772, 773, 774. The outer rectangular-shaped surface 760 is disposed substantially parallel to the inner rectangular-shaped surface 762 of the side wall 543. The outer rectangular-shaped surface 760 is larger than the inner rectangular-shaped surface 762. The trapezoidal-shaped side surfaces 771, 772, 773, 774 of the side wall 543 are coupled to and extend between the outer rectangular-shaped surface 760 and the inner rectangular-shaped surface 762.

Referring to FIGS. 7 and 15, the side wall 543 includes grooves 780, 782, 784, 786, 788, 790, 792, 794, 796, 798, 800, 802, 804, 806, 808 extending into the inner rectangular-shaped surface 762 of the side wall 543. The grooves 780-808 extend from the trapezoidal-shaped side surface 773 toward the trapezoidal-shaped side surface 774 of the side wall 543. Further, each of the grooves 780-808 extend substantially parallel to one another, and each of the grooves 780-808 are spaced apart a predetermined distance from adjacent grooves. The grooves 780, 782, 784, 786, 788, 790, 792, 794, 796, 798, 800, 802, 804, 806, 808 are sized and shaped to receive the peripheral ledge portions 172, 182, 192, 202, 212, 222, 232, 242, 252, 262, 272, 282, 292, 302, 312, respectively, of the battery cells 40, 42, 44, 46, 48, 50, 52, 54, 56, 58, 60, 62, 64, 66, 68, respectively. The living hinge 548 is disposed proximate to and between the trapezoidal-shaped side surface 574 of the side wall 541 and the trapezoidal-shaped side surface 773 of the side wall 543.

Referring to FIG. 15, the side wall 543 further includes a groove 810 extending into the inner rectangular-shaped surface 762 thereof. The groove 810 extends from the trapezoidal-shaped side surface 771 to the trapezoidal-shaped side surface 772 of the side wall 543 and substantially perpendicular to the grooves 780-808. The groove 810 is sized and shaped to receive a portion of the interconnect assembly 80 (shown in FIG. 20) therein.

Figure 8:
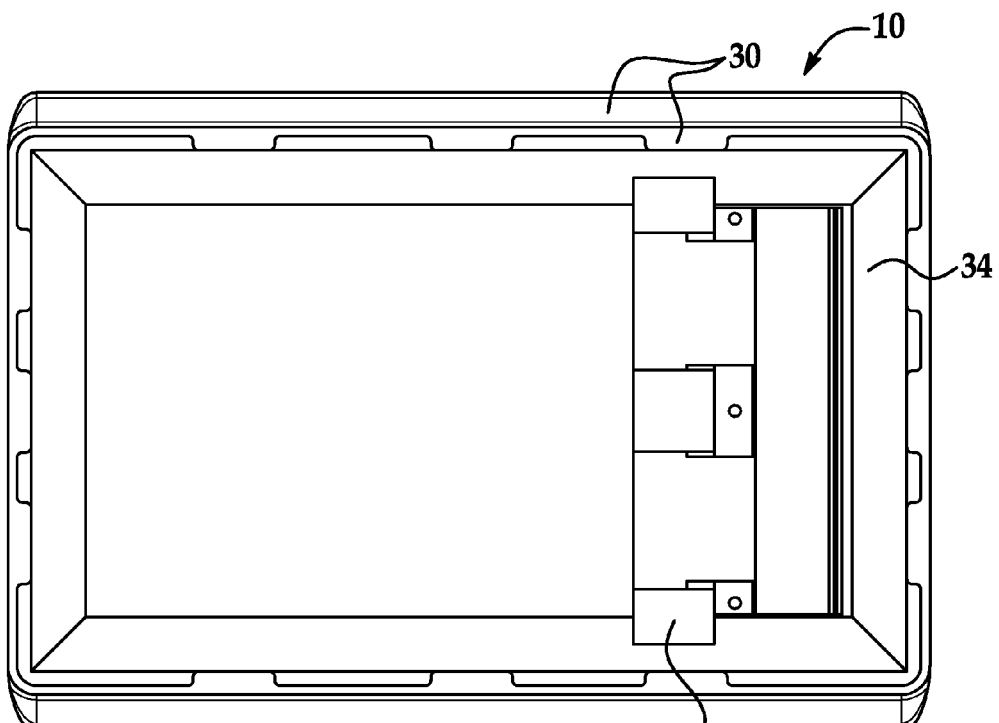
FIG. 8 is a top view of the battery cell assembly of FIG. 1 with a housing cover removed from the battery cell assembly.

Referring to FIGS. 4, 6 and 8, the interconnect assembly 80 is adapted to electrically couple the battery cells 40-68 together. The interconnect assembly 80 includes a body portion 900 and extension portions 902, 904 extending outwardly from the body portion 900. The body portion 900 includes apertures 910, 912, 914, 916, 918, 920, 922, 924, 926, 928, 930, 932, 934, 936, 938 extending therethrough for receiving electrical terminals from the battery cells 40-68 therethrough. The electrical terminals of the battery cells 40-68 are electrically coupled in series with one another utilizing conductive components (not shown) of the interconnect assembly 80. In an exemplary embodiment, a combined output voltage of the battery cells 40-68 is substantially 12 Vdc.

Referring to FIGS. 20-24, the process for assembling the battery cell assembly 10 will now be explained.

Figure 20:
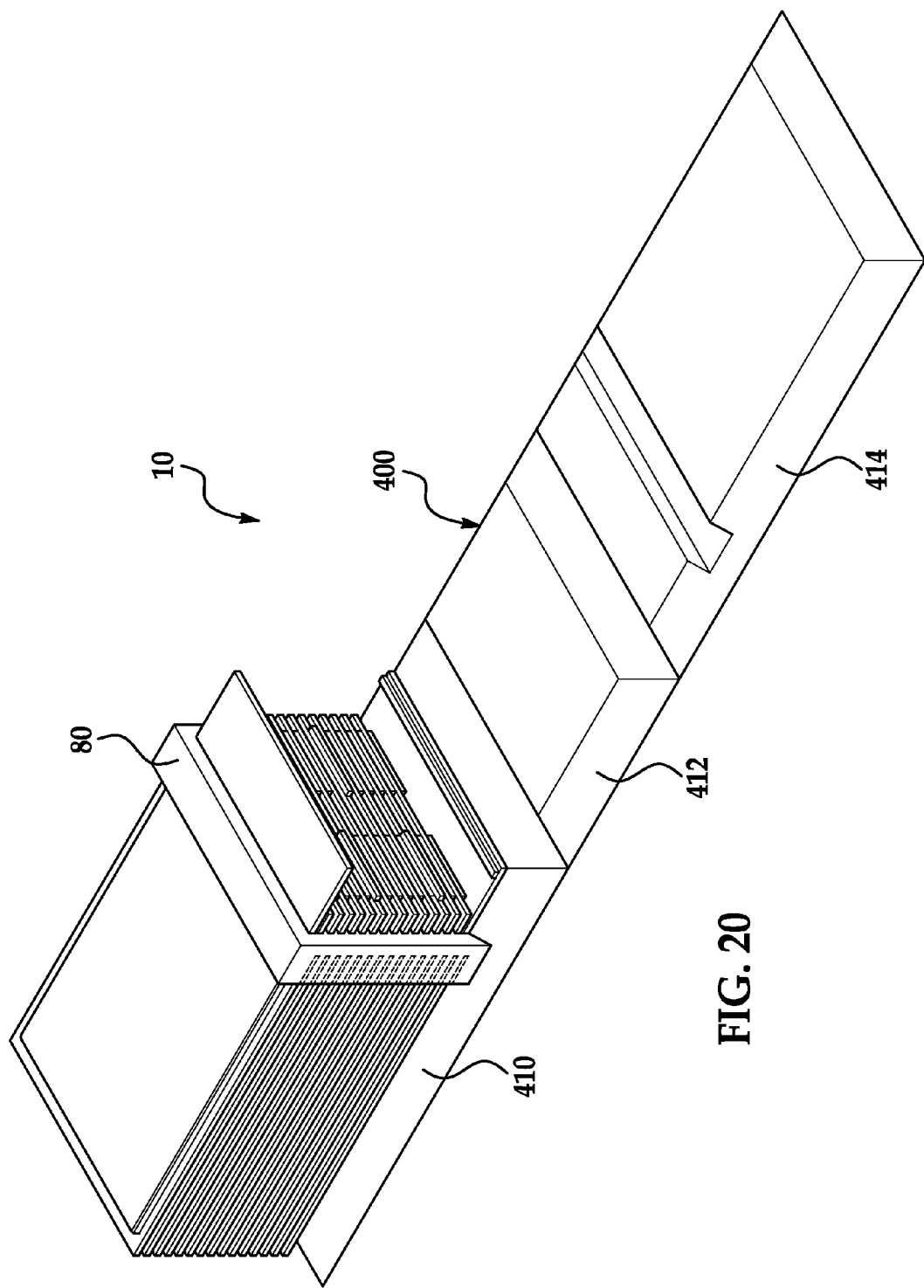
FIG. 20 is a schematic of a plurality of battery cells and an interconnect assembly disposed on the first unitary polymeric foam assembly of FIG. 10.

Initially, referring to FIGS. 4 and 20, the plurality of battery cells 40-68 are formed in a stack and are electrically coupled in series with one another utilizing the interconnect assembly 80.

Next, the plurality of battery cells 40-68 and interconnect assembly 80 are disposed on the bottom wall 410 of the first unitary polymeric foam assembly 400.

Figure 21:
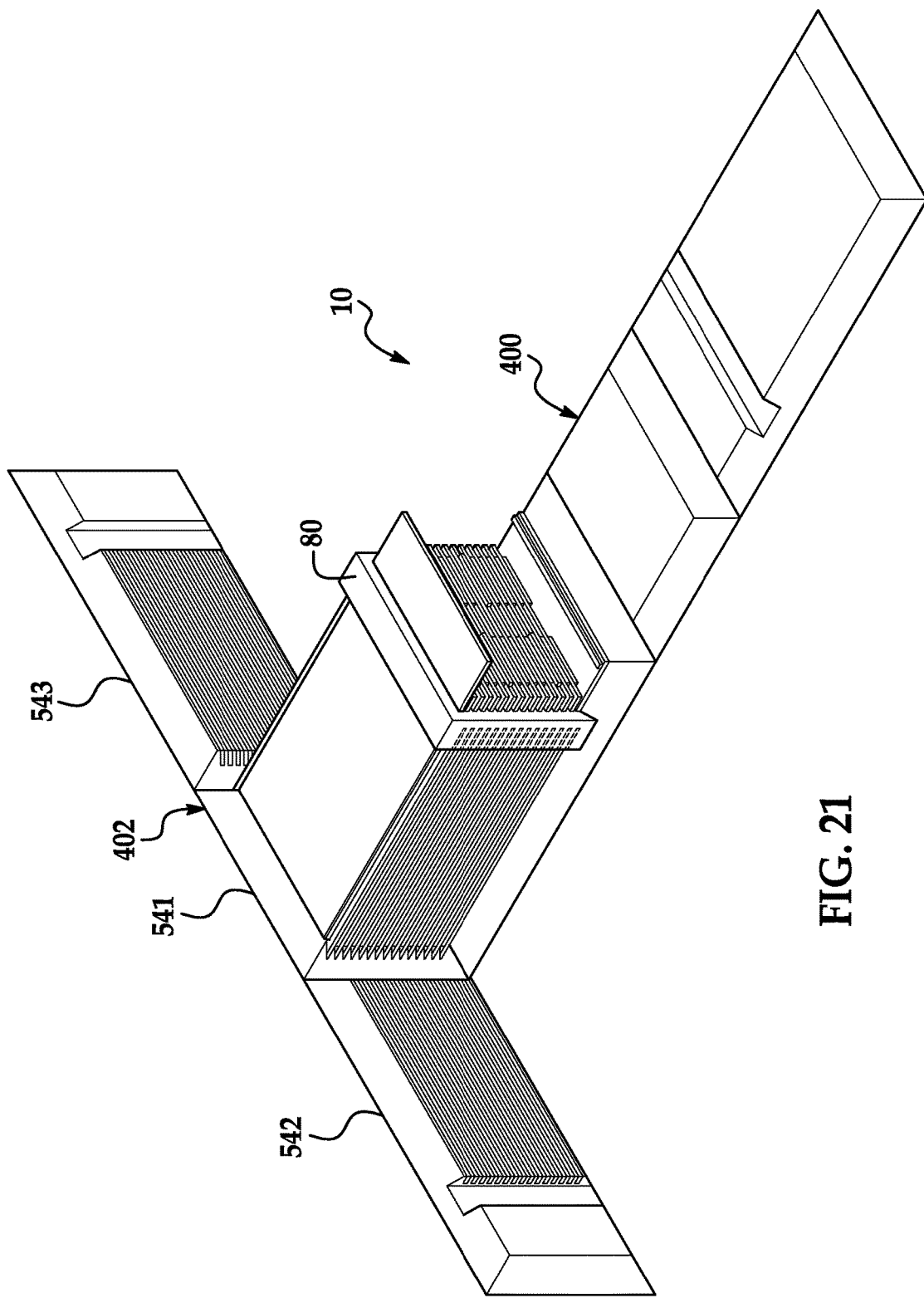
FIG. 21 is a schematic of a plurality of battery cells and an interconnect assembly disposed on the first unitary polymeric foam assembly of FIG. 10, and the second unitary polymeric foam assembly of FIG. 15 attached to a first side of the plurality of battery cells.

Next, referring to FIGS. 5 and 21, the side wall 541 of the second unitary polymeric foam assembly 402 is disposed against the battery cells 40-68 such that the grooves 580, 582, 584, 586, 588, 590, 592, 594, 596, 598, 600, 602, 604, 606, 608 receive the peripheral ledge portions 173, 183, 193, 203, 213, 223, 233, 243, 253, 263, 273, 283, 293, 303, 313, respectively, of the battery cells 40, 42, 44, 46, 48, 50, 52, 54, 56, 58, 60, 62, 64, 66, 68, respectively, therein. Further, referring to FIGS. 13 and 15, the trapezoidal-shaped side surface 571 of the side wall 401 is disposed directly against the trapezoidal-shaped side surface 443 of the bottom wall 410.

Figure 22:
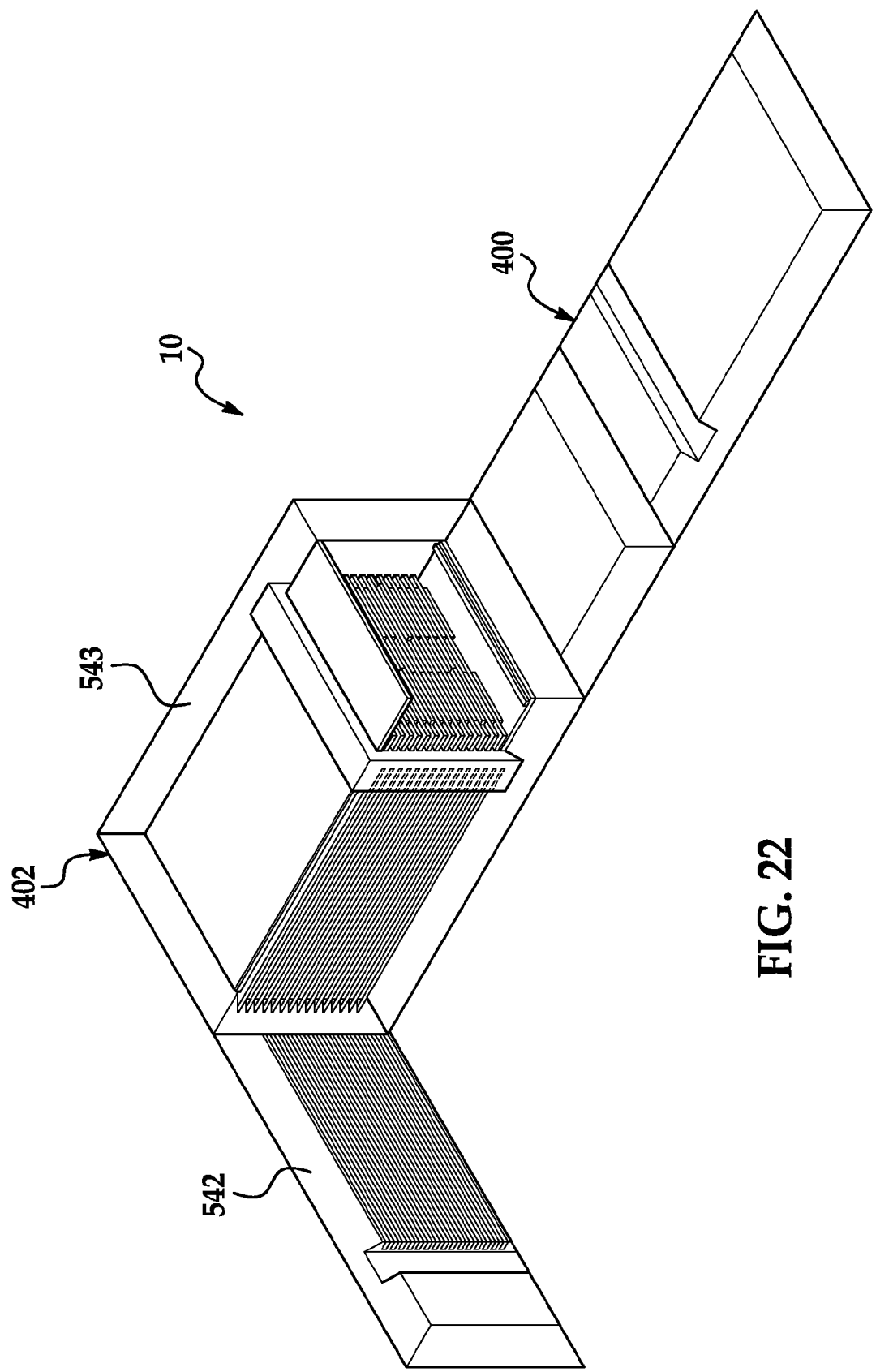
FIG. 22 is a schematic of a plurality of battery cells and an interconnect assembly disposed on the first unitary polymeric foam assembly of FIG. 10, and the second unitary polymeric foam assembly of FIG. 15 attached to first and second sides of the plurality of battery cells.

Next, referring to FIGS. 7 and 22, the side wall 543 of the second unitary polymeric foam assembly 402 is disposed against the battery cells 40-68 such that the grooves 780, 782, 784, 786, 788, 790, 792, 794, 796, 798, 800, 802, 804, 806, 808 receive the peripheral ledge portions 172, 182, 192, 202, 212, 222, 232, 242, 252, 262, 272, 282, 292, 302, 312, respectively, of the battery cells 40, 42, 44, 46, 48, 50, 52, 54, 56, 58, 60, 62, 64, 66, 68, respectively, therein. Further, referring to FIGS. 13 and 15, the trapezoidal-shaped side surface 773 of the side wall 543 is disposed directly against the trapezoidal-shaped side surface 574 of the side wall 541. Also, the trapezoidal-shaped side surface 771 of the side wall 543 is disposed directly against the trapezoidal-shaped side surface 442 of the bottom wall 410.

Figure 23:
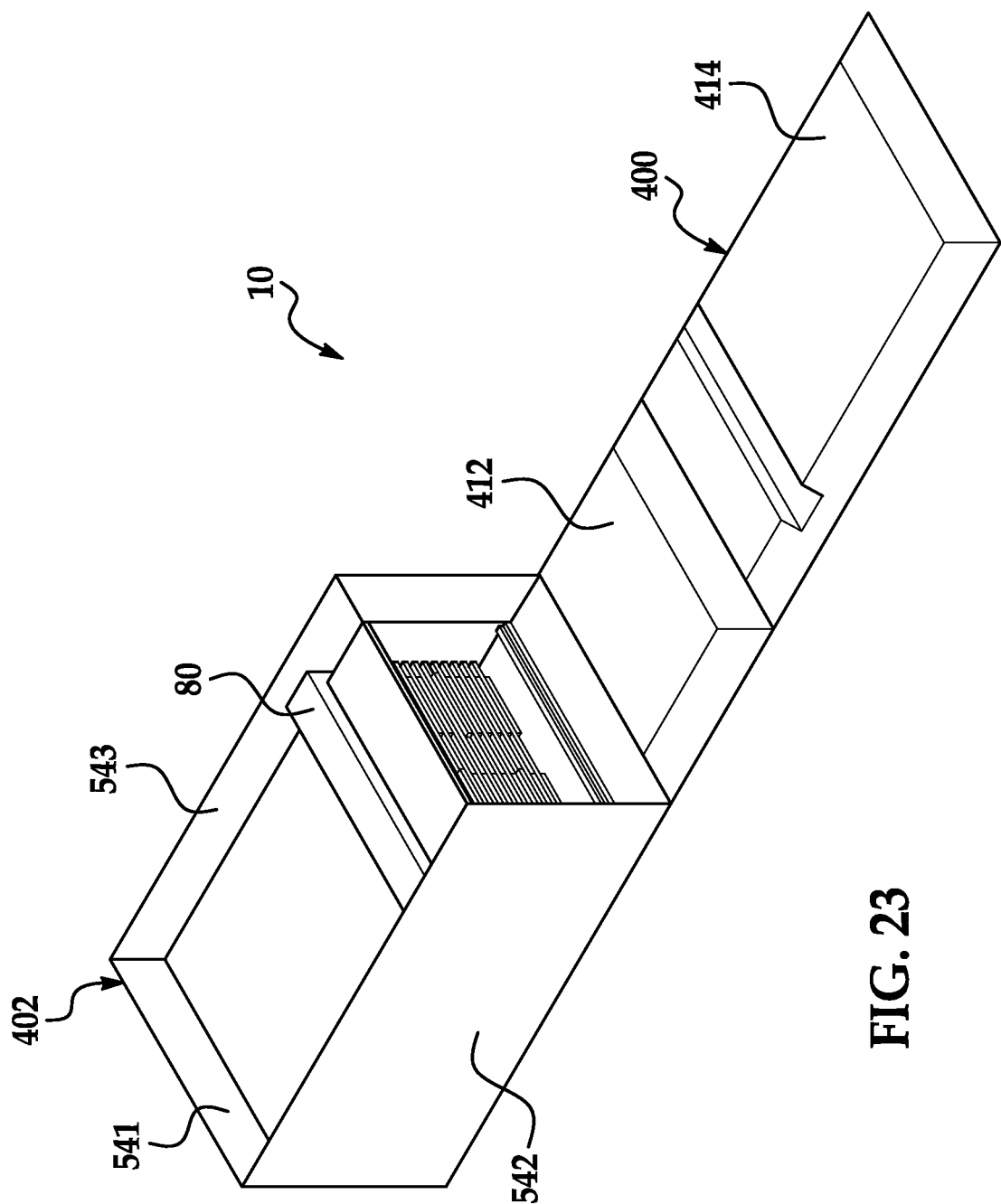
FIG. 23 is a schematic of a plurality of battery cells and an interconnect assembly disposed on the first unitary polymeric foam assembly of FIG. 10, and the second unitary polymeric foam assembly of FIG. 15 attached to first, second, and third sides of the plurality of battery cells.

Next, referring to FIGS. 7 and 23, the side wall 542 of the second unitary polymeric foam assembly 402 is disposed against the battery cells 40-68 such that the grooves 680, 682, 684, 686, 688, 690, 692, 694, 696, 698, 700, 702, 704, 706, 708 receive the peripheral ledge portions 171, 181, 191, 201, 211, 221, 231, 241, 251, 261, 271, 281, 291, 301, 311, respectively, of the battery cells 40, 42, 44, 46, 48, 50, 52, 54, 56, 58, 60, 62, 64, 66, 68, respectively, therein. Further, referring to FIGS. 13 and 15, the trapezoidal-shaped side surface 674 of the side wall 542 is disposed directly against the trapezoidal-shaped side surface 573 of the side wall 541. Also, the trapezoidal-shaped side surface 671 of the side wall 542 is disposed directly against the trapezoidal-shaped side surface 441 of the bottom wall 410.

Next, referring to FIGS. 4 and 24, the side wall 412 of the first unitary polymeric foam assembly 400 is disposed against the bottom wall 410 and the side walls 542, 543. In particular, referring to FIGS. 13 and 15, the trapezoidal-shaped side surface 473 of the side wall 412 is disposed directly against the trapezoidal-shaped side surface 444 of the bottom wall 410. Further, the trapezoidal-shaped side surface 472 of the side wall 412 is disposed directly against the trapezoidal-shaped side surface 774 of the side wall 543. Further, the trapezoidal-shaped side surface 673 of the side wall 542 is disposed directly against the trapezoidal-shaped side surface 443 of the bottom wall 410.

Next, referring to FIGS. 2, 13 and 15, the top wall 414 of the first unitary polymeric foam assembly 400 is disposed on the side walls 412, 541, 542, 543. In particular, the referring to FIGS. 13 and 15, the trapezoidal-shaped side surface 503 of the top wall 414 is disposed directly against the trapezoidal-shaped side surface 474 of the side wall 412. Also, the trapezoidal-shaped side surface 502 of the top wall 414 is disposed directly against the trapezoidal-shaped side surface 772 of the side wall 543. Further, the trapezoidal-shaped side surface 501 of the top wall 414 is disposed directly against the trapezoidal-shaped side surface 672 of the side wall 542. Further, the trapezoidal-shaped side surface 504 of the top wall 414 is disposed directly against the trapezoidal-shaped side surface 572 of the side wall 541.

Figure 3:
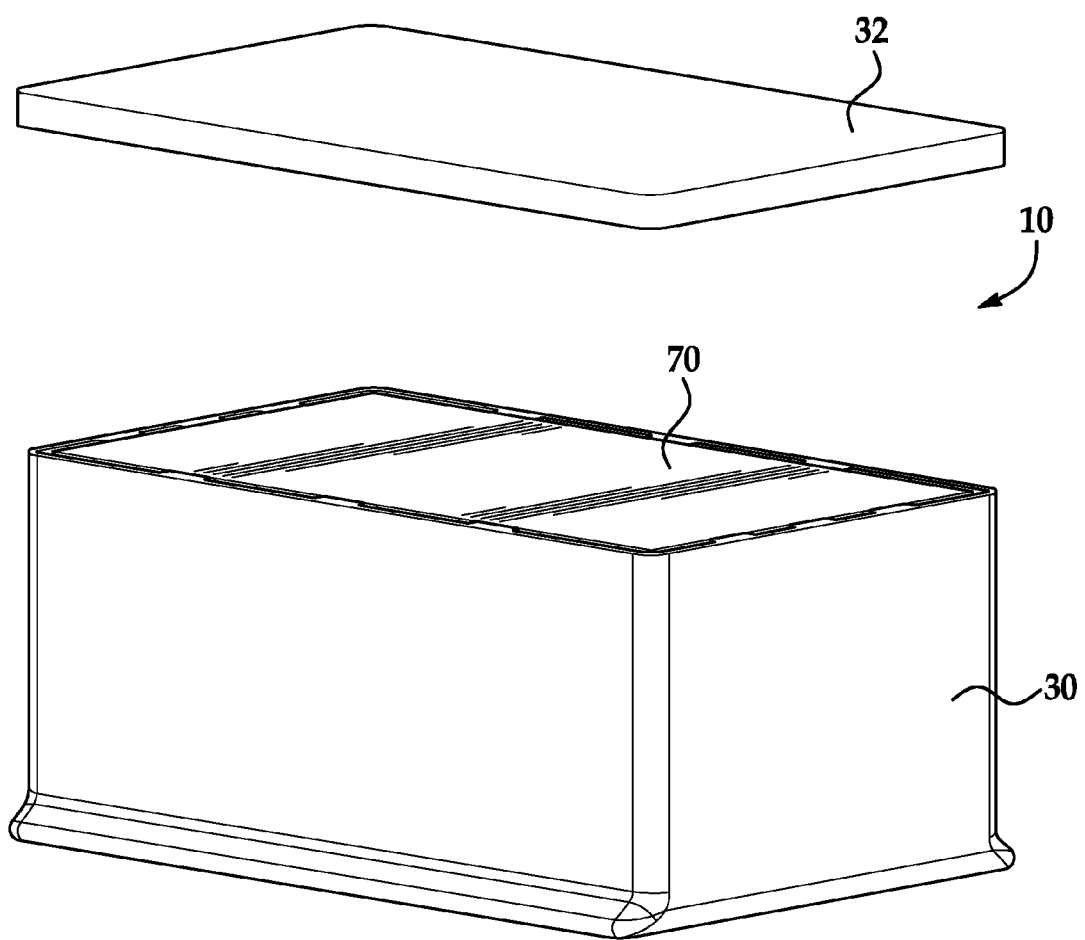
FIG. 3 is another partially exploded schematic of the battery cell assembly of FIG. 1.

Next, referring to FIGS. 3 and 7, the polymeric foam container 70, the battery cells 40-68, and the interconnect assembly 80 are disposed within the inner space 110 of the plastic housing 30.

Next referring to FIGS. 1 and 6, the housing cover 32 is coupled to the plastic housing 30.

The battery cell assembly described herein provides a substantial advantage over other battery cell assemblies. In particular, an advantage of the battery cell assembly is that the assembly utilizes a polymeric foam container to insulate battery cells from external heat energy while also holding the battery cells within grooves formed in the polymeric foam container.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery cell assembly, comprising:
a polymeric foam container having first, second, and third side walls defining an interior region, and a first unitary polymeric foam assembly defining a bottom wall, a fourth side wall, and a top wall; the first and second side walls extending parallel to one another; the third side wall extending between the first and second side walls and perpendicular to the first and second side walls; the fourth side wall extending between the first and second side walls and perpendicular to the first and second side walls and parallel to the third side wall, the bottom wall being rotatably coupled to the fourth side wall utilizing a first living hinge, the fourth side wall being rotatably coupled to the top wall utilizing a second living hinge; the first living hinge extending parallel to the second living hinge, the first, second, and third side walls having first, second, and third grooves, respectively, extending therein; and
a first battery cell having a first rectangular-shaped body with first, second, and third peripheral ledge portions; the first and second peripheral ledge portions of the first battery cell extending parallel to one another; the third peripheral ledge portion of the first battery cell extending between the first and second peripheral ledge portions of the first battery cell and perpendicular to the first and second peripheral ledge portions of the first battery cell; the first battery cell being disposed in the interior region such that first, second, and third peripheral ledge portions thereof are disposed in the first, second, and third grooves, respectively.

2. The battery cell assembly of claim 1, wherein the first, second, and third side walls further having fourth, fifth, and sixth grooves, respectively, extending therein; the fourth, fifth, and sixth grooves extending parallel to the first, second, and third grooves, respectively; the battery cell assembly further comprising:
a second battery cell having a first rectangular-shaped body with first, second, and third peripheral ledge portions; the first and second peripheral ledge portions of the second battery cell extending parallel to one another; the third peripheral ledge portion of the second battery cell extending between the first and second peripheral ledge portions of the second battery cell and perpendicular to the first and second peripheral ledge portions of the second battery cell; and
the second battery cell being disposed in the interior region such that first, second, and third peripheral ledge portions thereof are disposed in the fourth, fifth, and sixth grooves, respectively, in the first, second, and third side walls, respectively.

3. The battery cell assembly of claim 1, further comprising a plastic housing and a housing cover defining an inner space, the polymeric foam container and the first battery cell being disposed in the inner space, the housing cover being disposed over an opening of the plastic housing to enclose the opening, the housing cover being coupled to the plastic housing.

4. The battery cell assembly of claim 1, wherein the bottom wall has an outer rectangular-shaped surface, an inner rectangular-shaped surface, and first, second, third and fourth trapezoidal-shaped side surfaces; the outer rectangular-shaped surface of the bottom wall being disposed substantially parallel to the inner rectangular-shaped surface of the bottom wall, the outer rectangular-shaped surface of the bottom wall being larger than the inner rectangular-shaped surface of the bottom wall; the first, second, third, and fourth trapezoidal-shaped side surfaces of the bottom wall being coupled to and extending between the outer rectangular-shaped surface and the inner rectangular-shaped surface of the bottom wall.

5. The battery cell assembly of claim 4, wherein the bottom wall further includes a fourth groove extending into the inner rectangular-shaped surface thereof, the fourth groove extending from the first trapezoidal-shaped side surface to the second trapezoidal-shaped side surface of the bottom wall, the fourth groove sized and shaped to receive a portion of an interconnect assembly therein.

6. The battery cell assembly of claim 4, wherein the fourth side wall has an outer rectangular-shaped surface, an inner rectangular-shaped surface, and first, second, third and fourth trapezoidal-shaped side surfaces; the outer rectangular-shaped surface of the fourth side wall being disposed substantially parallel to the inner rectangular-shaped surface of the fourth side wall, the outer rectangular-shaped surface of the fourth side wall being larger than the inner rectangular-shaped surface of the fourth side wall; the first, second, third, and fourth trapezoidal-shaped side surfaces of the fourth side wall being coupled to and extending between the outer rectangular-shaped surface and the inner rectangular-shaped surface of the fourth side wall.

7. The battery cell assembly of claim 6, wherein the first living hinge being disposed between the fourth trapezoidal-shaped side surface of the bottom wall and the first trapezoidal-shaped side surface of the fourth side wall.

8. The battery cell assembly of claim 6, wherein the top wall has an outer rectangular-shaped surface, an inner rectangular-shaped surface, and first, second, third and fourth trapezoidal-shaped side surfaces; the outer rectangular-shaped surface of the top wall being disposed substantially parallel to the inner rectangular-shaped surface of the top wall, the outer rectangular-shaped surface of the top wall being larger than the inner rectangular-shaped surface of the top wall; the first, second, third, and fourth trapezoidal-shaped side surfaces of the top wall being coupled to and extending between the outer rectangular-shaped surface and the inner rectangular-shaped surface of the top wall.

9. The battery cell assembly of claim 8, wherein the second living hinge being disposed between the fourth trapezoidal-shaped side surface of the fourth side wall and the first trapezoidal-shaped side surface of the top wall.

10. The battery cell assembly of claim 8, wherein the top wall further includes a fourth groove extending into the inner rectangular-shaped surface thereof, the fourth groove extending from the first trapezoidal-shaped side surface to the second trapezoidal-shaped side surface of the top wall, the fourth groove sized and shaped to receive a portion of an interconnect assembly therein.

11. The battery cell assembly of claim 1, wherein the polymeric foam container further includes a second unitary polymeric foam assembly defining the first, second, and third side walls; the first side wall being disposed between and coupled to the second and third side walls, the second side wall being rotatably coupled to the first side wall utilizing a third living hinge; the third side wall being rotatably coupled to the first side wall utilizing a fourth living hinge; the third living hinge extending parallel to the fourth living hinge.

12. The battery cell assembly of claim 11, wherein the first side wall has an outer rectangular-shaped surface, an inner rectangular-shaped surface, and first, second, third and fourth trapezoidal-shaped side surfaces; the outer rectangular-shaped surface of the first side wall being disposed substantially parallel to the inner rectangular-shaped surface of the first side wall, the outer rectangular-shaped surface of the first side wall being larger than the inner rectangular-shaped surface of the first side wall; the first, second, third and fourth trapezoidal-shaped side surfaces of the first side wall being coupled to and extending between the outer rectangular-shaped surface and the inner rectangular-shaped surface of the first side wall.

13. The battery cell assembly of claim 12, wherein the first groove extending into the inner rectangular-shaped surface of the first side wall, the first groove extending from the third trapezoidal-shaped side surface to the fourth trapezoidal-shaped side surface of the first side wall.

14. The battery cell assembly of claim 12, wherein the second side wall has an outer rectangular-shaped surface, an inner rectangular-shaped surface, and first, second, third and fourth trapezoidal-shaped side surfaces; the outer rectangular-shaped surface of the second side wall being disposed substantially parallel to the inner rectangular-shaped surface of the second side wall, the outer rectangular-shaped surface of the second side wall being larger than the inner rectangular-shaped surface of the second side wall; the first, second, third, and fourth trapezoidal-shaped side surfaces of the second side wall being coupled to and extending between the outer rectangular-shaped surface and the inner rectangular-shaped surface of the second side wall.

15. The battery cell assembly of claim 14, wherein the third living hinge being disposed proximate to the fourth trapezoidal-shaped side surface of the second side wall and the first trapezoidal-shaped side surface of the first side wall.

16. The battery cell assembly of claim 14, wherein the second groove extending into the inner rectangular-shaped surface of the second side wall, the second groove extending from the fourth trapezoidal-shaped side surface toward the third trapezoidal-shaped side surface of the second side wall.

17. The battery cell assembly of claim 16, wherein the second side wall further includes a fourth groove extending into the inner rectangular-shaped surface thereof, the fourth groove extending from the first trapezoidal-shaped side surface to the second trapezoidal-shaped side surface of the second side wall and substantially perpendicular to the second groove, the fourth groove sized and shaped to receive a portion of an interconnect assembly therein.

18. The battery cell assembly of claim 16, wherein the third side wall has an outer rectangular-shaped surface, an inner rectangular-shaped surface, and first, second, third and fourth trapezoidal-shaped side surfaces; the outer rectangular-shaped surface of the third side wall being disposed substantially parallel to the inner rectangular-shaped surface of the third side wall, the outer rectangular-shaped surface of the third side wall being larger than the inner rectangular-shaped surface of the third side wall; the first, second, third, and fourth trapezoidal-shaped side surfaces of the third side wall being coupled to and extending between the outer rectangular-shaped surface and the inner rectangular-shaped surface of the third side wall.

19. The battery cell assembly of claim 18, wherein the third groove extending into the inner rectangular-shaped surface of the third side wall, the third groove extending from the third trapezoidal-shaped side surface toward the fourth trapezoidal-shaped side surface of the third side wall.

20. The battery cell assembly of claim 19, wherein the third side wall further includes a fourth groove extending into the inner rectangular-shaped surface thereof, the fourth groove extending from the first trapezoidal-shaped side surface to the second trapezoidal-shaped side surface of the third side wall and substantially perpendicular to the third groove, the fourth groove sized and shaped to receive a portion of an interconnect assembly therein.

21. The battery cell assembly of claim 18, wherein the fourth living hinge being disposed between the fourth trapezoidal-shaped side surface of the first side wall and the first trapezoidal-shaped side surface of the third side wall.

22. A battery cell assembly, comprising:
a polymeric foam container having first, second, third, and fourth side walls, a bottom wall, and a top wall defining an interior region; the third side wall extending between the first and second side walls; the fourth side wall extending between the first and second side walls, the first, second, and third side walls having first, second, and third grooves, respectively, extending therein; the bottom wall being rotatably coupled to the fourth side wall utilizing a first living hinge, the fourth side wall being rotatably coupled to the top wall utilizing a second living hinge;
a first battery cell having a first rectangular-shaped body with first, second, and third peripheral ledge portions; the first battery cell being disposed in the interior region such that first, second, and third peripheral ledge portions thereof are disposed in the first, second, and third grooves, respectively; and
a plastic housing and a housing cover defining an inner space, the polymeric foam container and the first battery cell being disposed in the inner space, the housing cover being disposed over an opening of the plastic housing to enclose the opening, the housing cover being coupled to the plastic housing.

23. The battery cell assembly of claim 22, wherein the first and second peripheral ledge portions of the first battery cell extending parallel to one another; the third peripheral ledge portion of the first battery cell extending between the first and second peripheral ledge portions of the first battery cell and perpendicular to the first and second peripheral ledge portions of the first battery cell.

24. The battery cell assembly of claim 22, wherein the polymeric foam container includes first and second unitary polymeric foam assemblies; the first unitary polymeric foam assembly having the bottom wall, the fourth side wall, and the top wall; and the second unitary polymeric foam assembly having the first, second, and third side walls.

* * * * *